United States Patent
Choubey et al.

(10) Patent No.: US 10,997,773 B2
(45) Date of Patent: May 4, 2021

(54) DYNAMIC TILING FOR FOVEATED RENDERING

(71) Applicant: Facebook Technologies, LLC, Menlo Park, CA (US)

(72) Inventors: Neeraj Choubey, Belmont, CA (US); Igor Kozintsev, San Jose, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/818,750

(22) Filed: Mar. 13, 2020

(65) Prior Publication Data
US 2020/0394830 A1    Dec. 17, 2020

Related U.S. Application Data

(60) Provisional application No. 62/861,106, filed on Jun. 13, 2019.

(51) Int. Cl.
    *G09G 5/00*    (2006.01)
    *G06T 15/00*   (2011.01)
    *G06F 3/01*    (2006.01)

(52) U.S. Cl.
    CPC ............ *G06T 15/005* (2013.01); *G06F 3/013* (2013.01)

(58) Field of Classification Search
    CPC ............................ G06F 3/013; G06T 15/005
    See application file for complete search history.

(56) References Cited

U.S. PATENT DOCUMENTS

| | | | |
|---|---|---|---|
| 2016/0262613 A1* | 9/2016 | Klin | A61B 5/163 |
| 2017/0287446 A1 | 10/2017 | Young et al. | |
| 2018/0113316 A1 | 4/2018 | Hua et al. | |
| 2018/0137598 A1* | 5/2018 | Spitzer | G06F 3/013 |
| 2018/0224935 A1 | 8/2018 | Thunstrom | |
| 2019/0025589 A1 | 1/2019 | Haddick | |
| 2019/0094958 A1 | 3/2019 | Williams et al. | |

FOREIGN PATENT DOCUMENTS

| | | |
|---|---|---|
| GB | 2 567 553 A | 4/2019 |
| WO | WO-2017/031089 A1 | 2/2017 |
| WO | WO-2019/026765 A1 | 2/2019 |
| WO | WO-2019/067157 A1 | 4/2019 |
| WO | WO-2019/092399 A1 | 5/2019 |

OTHER PUBLICATIONS

International Search Report and Written Opinion on non-Foley case related to U.S. Appl. No. 16/818,750 dated Sep. 9, 2020.

* cited by examiner

*Primary Examiner* — Insa Sadio
(74) *Attorney, Agent, or Firm* — Foley & Lardner LLP

(57) ABSTRACT

A method for providing imagery to a user on a display includes receiving eye tracking data and determining a gaze location on the display or a gaze vector using the eye tracking data. The method can also include defining a first tile using the gaze location on the display or the gaze vector. The first tile may have a height and a width, the height and width being determined using the eye tracking data. The method can further include defining multiple additional tiles to fill an entire area of the display. The method can also include providing a portion of an image using the first tile at a first image quality and providing another portion of the image at a second image quality using at least one of the multiple additional tiles.

20 Claims, 9 Drawing Sheets

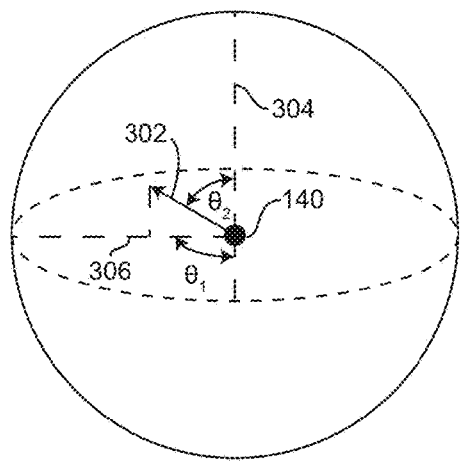 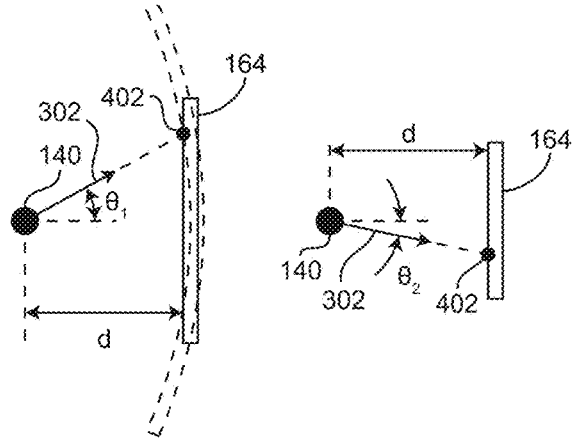
FIG. 3　　　　FIG. 4　　　　FIG. 5
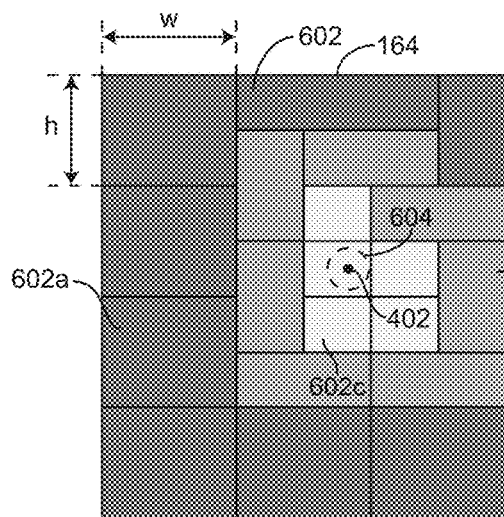 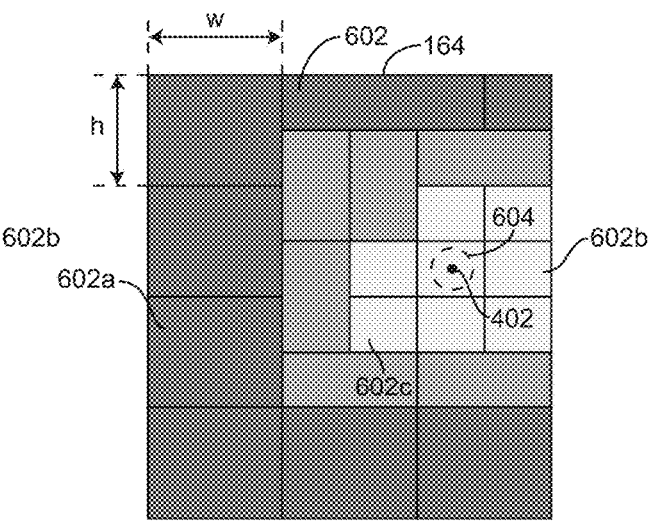
FIG. 6　　　　　　　　FIG. 7

DYNAMIC TILING FOR FOVEATED RENDERING

CROSS-REFERENCE TO RELATED APPLICATION

The present application claims the benefit of and priority to U.S. Provisional Patent No. 62/861,106, filed Jun. 13, 2019, the entire disclosure of which is incorporated by reference herein.

FIELD OF THE DISCLOSURE

The present disclosure relates generally to display systems. More particularly, the present disclosure relates to systems and methods for using eye tracking with foveated rendering.

BACKGROUND

The present disclosure relates generally to augmented reality (AR), mixed reality (MR) and/or virtual reality (VR) systems. AR, MR, and VR systems can be used to present various images, including three-dimensional (3D) images, to a user. For example, AR, MR or VR headsets can be used to present images to the user in a manner that is overlaid on a view of a real world environment or that simulates a virtual environment. To render convincing, life-like AR/MR/VR images, the AR/MR/VR systems can use eye tracking to track the user's eye and accordingly present images.

SUMMARY

One implementation of the present disclosure is a method for providing imagery to a user on a display. The method may include receiving eye tracking data. The method may further include determining a gaze location on the display or a gaze vector using the eye tracking data. The method can further include defining a first tile using the gaze location on the display or the gaze vector. The first tile may have a height and a width, the height and width being determined using the eye tracking data. The method can further include defining multiple additional tiles to fill an entire area of the display. The method can also include providing a portion of an image using the first tile at a first image quality and providing another portion of the image at a second image quality using at least one of the multiple additional tiles.

Another implementation of the present disclosure is a head mounted display for providing imagery to a user. The head mounted display can include a display, and eye tracker, and a processor. The eye tracker can be configured to provide eye tracking data. The processor can be configured to determine a gaze location on the display or a gaze vector using the eye tracking data. The processor can further be configured to define a first tile using the gaze location or the gaze vector. The processor can further be configured to define multiple additional tiles to fill an area of the display. A portion of an image may be provided on the display using the first tile at a first image quality and other portions of the image may be provided on the display at a second image quality using at least one of the multiple additional tiles.

Another implementation of the present disclosure is a display for providing foveated imagery to a user. The display may include processing circuitry configured to track a gaze direction or a gaze vector of the user's eye. The processing circuitry may be further configured to define a first tile based on the gaze direction or gaze vector of the user's eye. A location of the first tile is defined using the gaze direction or the gaze vector and is for a first image quality. The processing circuitry may be configured to define one or more additional tiles for a second image quality different than the first image quality. The processing circuitry can be configured to provide imagery using the first tile and each of the one or more additional tiles. The processing circuitry may also be configured to redefine the location of the first tile in response to a change in the gaze direction or gaze vector.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 3 is a spherical coordinate system showing a gaze vector of a user's eye, according to some embodiments.

FIG. 4 is a top view of the gaze vector of FIG. 3 directed towards a display screen, according to some embodiments.

FIG. 5 is a side view of the gaze vector of FIG. 3 directed towards a display screen, according to some embodiments.

FIG. 6 is a tiled display screen with foveated rendering, according to some embodiments.

FIG. 7 is the tiled display screen of FIG. 6 with foveated rendering after the user's gaze has shifted to a new location, according to some embodiments.

DETAILED DESCRIPTION

Overview

Referring generally to the FIGURES, systems and methods for providing foveated images to a user are shown, according to some embodiments. Tiles are used to display the foveated images, according to some embodiments. A user's eye is tracked to determine gaze direction and/or focal point, according to some embodiments. The gaze direction and/or focal point is used to determine a gaze location on a display, according to some embodiments. The gaze location can be a gaze location (X, Y) on a two dimensional display or a gaze location (X, Y, Z) on a three dimensional display. In some embodiments, an error associated with the gaze direction and/or the gaze location on the display is also determined.

Various eye tracking sensors, devices, hardware, software, etc., are used to track the user's eye and to determine the gaze location on the display, according to some embodiments. A tile is defined that is centered at the gaze location on the display, and additional tiles are also defined to fill out remaining area of the display, according to some embodiments. The tile that is centered at the gaze location on the display is updated in real-time to track the user's gaze direction as it changes, according to some embodiments. In some embodiments, the tile that is centered at the gaze location is for imagery at a high image quality, and tiles that are adjacent or near or otherwise on the display are for imagery at a same or lower quality.

The use of the tile centered at the gaze location and the additional tiles facilitates a foveated display, according to some embodiments. In some embodiments, imagery of the tile centered at the gaze location and the additional tiles are rasterized to achieve a foveated display of the imagery. In some embodiments, sizes and/or shapes of the various tiles are adjusted in real-time to account for error associated with the gaze direction of the user's eye. The system can rasterize image data for tiles with lower resolution, lower detail, or lower image quality and upscale (e.g., using nearest neighbor) the rasterized imagery to provide a smooth transition between tiles, according to some embodiments. In some embodiments, tiles that are further away from the gaze location are associated with lower image quality. Advantageously, the systems and methods described herein facilitate reduced power consumption of processing circuitry, but still provide detailed imagery within the fovea region, according to some embodiments.

Virtual Reality or Augmented Reality System

Figure 1:
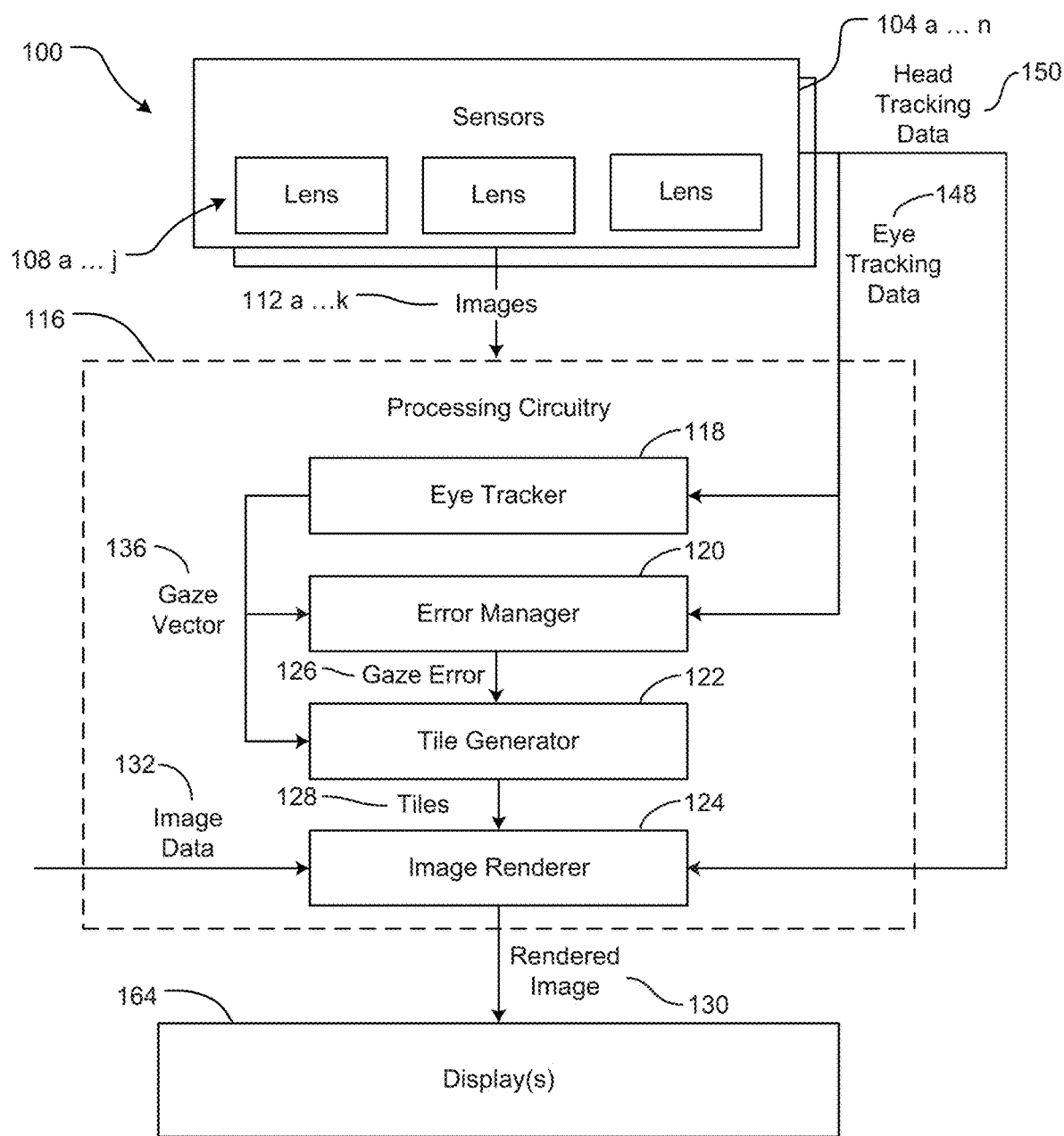
FIG. 1 is a block diagram of a display system, according to some embodiments.

Referring now to FIG. 1, a system 100 can include a plurality of sensors 104a . . . n, processing circuitry 116, and one or more displays 164. System 100 can be implemented using HMD system 200 described in greater detail below with reference to FIG. 2. System 100 may be configured as an HMD system or a head wearable display (HWD) system. System 100 can be implemented using the computing environment described with reference to FIG. 4. System 100 can incorporate features of and be used to implement features of virtual reality (VR) systems. At least some of processing circuitry 116 can be implemented using a graphics processing unit (GPU). The functions of processing circuitry 116 can be executed in a distributed manner using a plurality of processing units.

Processing circuitry 116 may include one or more circuits, processors, and/or hardware components. Processing circuitry 116 may implement any logic, functions or instructions to perform any of the operations described herein. Processing circuitry 116 can include any type and form of executable instructions executable by any of the circuits, processors or hardware components. The executable instructions may be of any type including applications, programs, services, tasks, scripts, libraries processes and/or firmware. Any of eye tracker 118, error manager 120, tile generator 122, an image renderer 124 may be any combination or arrangement of circuitry and executable instructions to perform their respective functions and operations. At least some portions of processing circuitry 116 can be used to implement image processing executed by sensors 104.

Sensors 104a . . . n can be image capture devices or cameras, including video cameras. Sensors 104a . . . n may be cameras that generate images of relatively low quality (e.g., relatively low sharpness, resolution, or dynamic range), which can help reduce the size, weight, and power requirements of system 100. For example, sensors 104a . . . n can generate images having resolutions on the order of hundreds of pixels by hundreds of pixels. At the same time, the processes executed by system 100 as described herein can be used to generate display images for presentation to a user that have desired quality characteristics, including depth characteristics.

Sensors 104a . . . n (generally referred herein as sensors 104) can include any type of one or more cameras. The cameras can be visible light cameras (e.g., color or black and white), infrared cameras, or combinations thereof. Sensors 104a . . . n can each include one or more lenses 108a . . . j generally referred herein as lens 108). In some embodiments, sensor 104 can include a camera for each lens 108. In some embodiments, sensor 104 include a single camera with multiple lenses 108a . . . j. In some embodiments, sensor 104 can include multiple cameras, each with multiple lenses 108. The one or more cameras of sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing calibration techniques described herein.

The one or more cameras of sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

System 100 can include a first sensor (e.g., image capture device) 104a that includes a first lens 108a, first sensor 104a arranged to capture a first image 112a of a first view, and a second sensor 104b that includes a second lens 108b, second sensor 104b arranged to capture a second image 112b of a second view. The first view and the second view may correspond to different perspectives, enabling depth information to be extracted from first image 112a and second image 112b. For example, the first view may correspond to a left eye view, and the second view may correspond to a right eye view. System 100 can include a third sensor 104c that includes a third lens 108c, third sensor 104c arranged to capture a third image 112c of a third view. As described with reference to FIG. 2, the third view may correspond to a top view that is spaced from an axis between first lens 108a and second lens 108b, which can enable system 100 to more effectively handle depth information that may be difficult to address with first sensor 104a and second sensor 104b, such as edges (e.g., an edge of a table) that are substantially parallel to the axis between first lens 108a and second lens 108b.

Light of an image to be captured by sensors 104a . . . n can be received through the one or more lenses 108a . . . j. Sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, sensors 104a . . . n can use the sensor circuitry to generate first image 112a corresponding to the first view and second image 112b corresponding to the second view. The one or more sensors 104a . . . n can provide images 112a . . . k to processing circuitry 116. The one or more sensors 104a . . . n can provide images 112a . . . k with a corresponding timestamp, which can facilitate synchronization of images 112a . . . k when image processing is executed on images 112a . . . k, such as to identify particular first and second images 112a, 112b representing first and second views and having the same timestamp that should be compared to one another to calculate gaze information.

Figure 2:
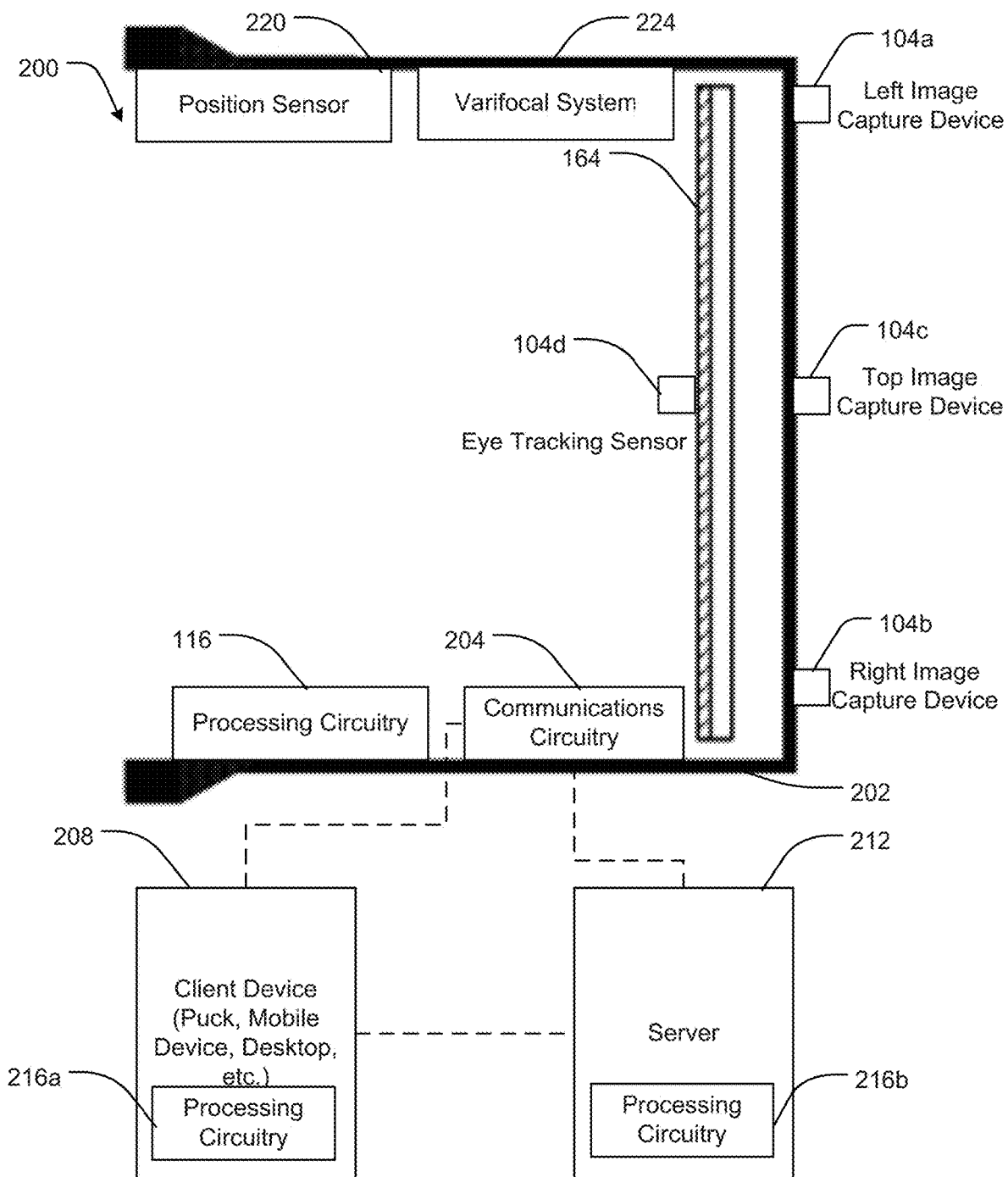
FIG. 2 is a schematic diagram of a head-mounted display (HMD) system, according to some embodiments.

Sensors 104 can include eye tracking sensors 104 or head tracking sensors 104 that can provide information such as positions, orientations, or gaze directions of the eyes or head of the user (e.g., wearer) of an HMD. In some embodiments, sensors 104 are inside out tracking cameras configured to provide images for head tracking operations. Sensors 104 can be eye tracking sensors 104 that provide eye tracking data 148, such as data corresponding to at least one of a position or an orientation of one or both eyes of the user. Sensors 104 can be oriented in a direction towards the eyes of the user (e.g., as compared to sensors 104 that capture images of an environment outside of the HMD). For example, sensors 104 can include at least one fourth sensor 104d (e.g., as illustrated in FIG. 2) which can be oriented towards the eyes of the user to detect sensor data regarding the eyes of the user.

In some embodiments, sensors 104 output images of the eyes of the user, which can be processed to detect an eye position or gaze direction (e.g., first gaze direction) of the eyes. In some embodiments, sensors 104 process image data regarding the eyes of the user, and output the eye position or gaze direction based on the image data. In some embodiments, sensors 104 optically measure eye motion, such as by emitting light (e.g., infrared light) towards the eyes and detecting reflections of the emitted light.

As discussed further herein, an eye tracking operation can include any function, operation, routine, logic, or instructions executed by system 100 or components thereof to track data regarding eyes of the user, such as positions or orientations (e.g., gaze directions) of the eyes of the user as the eyes of the user move during use of the HMD. For example, the eye tracking operation can be performed using at least one of one or more sensors 104 or eye tracker 118. For example, the eye tracking operation can process eye tracking data 148 from sensor 104 to determine an eye position, gaze direction, gaze vector, focal point, point of view, etc., shown as gaze vector 136 of eye(s) of the user. In some embodiments, the eye tracking operation can be performed using eye tracker 118 that is implemented using a portion of processing circuitry 116 that is coupled with, mounted to, integral with, implemented using a same circuit board as, or otherwise provided with one or more sensors 104 that detect sensor data regarding the eyes of the user. In some embodiments, the eye tracking operation can be performed using an eye tracker 118 that receives sensor data by a wired or wireless connection from the one or more sensors 104 that are configured to detect sensor data regarding the eyes of the user (e.g., images of the eyes of the user); for example, eye tracker 118 can be implemented using the same processing hardware as at least one of error manager 120, tile generator 122, and/or image renderer 124. Various such combinations of sensor hardware of sensors 104 and/or processing hardware of processing circuitry 116 may be used to implement the eye tracking operation.

Eye tracker 118 can generate gaze vector 136 in various manners. For example, eye tracker 118 can process eye tracking data 148 to identify one or more pixels representing at least one of a position or an orientation of one or more eyes of the user. Eye tracker 118 can identify, using eye tracking data 148, gaze vector 136 based on pixels corresponding to light (e.g., light from light sources/light emitting diodes/actuators of sensors 104, such as infrared or near-infrared light from actuators of sensors 104, such as 850 nm light eye tracking) reflected by the one or more eyes of the user. Eye tracker 118 can use light from various illumination sources or reflections in the HMD or AR system, such as from waveguides, combiners, or lens cameras. Eye tracker 118 can determine gaze vector 136 or eye position by determining a vector between a pupil center of one or more eyes of the user and a corresponding reflection (e.g., corneal reflection). Gaze vector 136 can include position data such as at least one of a position or an orientation of each of one or more eyes of the user. The position data can be in three-dimensional space, such as three-dimensional coordinates in a Cartesian, spherical, or other coordinate system. Gaze vector 136 can include position data including a gaze direction of one or more eyes of the user. In some embodiments, eye tracker 118 includes a machine learning model.

The machine learning model can be used to generate eye position or gaze vector 136 based on eye tracking data 148.

Processing circuitry 116 can include an error manager 120. Error manager 120 is configured to receive eye tracking data 148 from sensor(s) 104 and determine gaze error 126 associated with gaze vector 136. Gaze error 126 can include error for eye position, gaze direction, eye direction, etc., of gaze vector 136 (e.g., gaze location, gaze vector 302, etc.). Error manager 120 can receive eye tracking data 148 from sensor(s) 104 and perform an error analysis to determine gaze error 126. Error manager 120 monitors eye tracking data 148 over time and/or gaze vector 136 over time and determines gaze error 126 based on eye tracking data 148 and/or gaze vector 136, according to some embodiments. In some embodiments, error manager 120 provides gaze error 126 to tile generator 122. Eye tracker 118 also provides gaze vector 136 to tile generator 122, according to some embodiments. Error manager 120 can be configured to identify, determine, calculate, etc., any of rotational velocity, prediction error, fixation error, a confidence interval of gaze vector 136, random error, measurement error of gaze vector 136, etc.

Processing circuitry 116 includes tile generator 122, according to some embodiments. Tile generator 122 is configured to receive gaze vector 136 from eye tracker 118 and gaze error 126 from error manager 120, according to some embodiments. Tile generator 122 is configured to define one or more tiles 128 (e.g., tiles 602 shown in FIGS. 6-15 and 21), superpixels, collection of pixels, render areas, resolution areas, etc., for image renderer 124, according to some embodiments. Tile generator 122 generates tiles 128 based on gaze vector 136, a focal gaze location of the user's eyes, a reference gaze location, a direction of gaze, eye position, a point of interest, etc., according to some embodiments. Tile generator 122 generates various subsets of tiles 128 for display on display(s) 164 and corresponding resolutions, according to some embodiments. In some embodiments, tile generator 122 defines a first set of tiles 128 that should have a high resolution (e.g., a high level of detail, high image quality, etc.), a second set of tiles 128 that should have a medium resolution, and a third set of tiles that should have a low resolution. Tiles 128 include a corresponding size (e.g., height and width, number of pixels, gaze angles, etc.) for each tile 128, according to some embodiments.

In some embodiments, tiles 128 include data regarding a corresponding position on display(s) 164. For example, tile generator 122 generates multiple tiles 128 that collectively cover an entirety of display(s) 164 and associated positions within display(s) 164, according to some embodiments. Tile generator 122 provides tiles 128 to image renderer 124 for use in generating a rendered image 130, according to some embodiments. Tile generator 122 also generates or defines tiles 128 based on gaze error 126, according to some embodiments. In some embodiments, tile generator 122 divides a total area of display(s) 164 into various subsections, collection of pixels, etc., referred to as tiles 128. Tile generator 122 assigns a corresponding resolution to each of tiles 128, according to some embodiments. In some embodiments, tile generator 122 redefines tiles 128 periodically or dynamically based on updated or new gaze error 126 and/or gaze vector 136. In some embodiments, tile generator 122 defines a size, shape, position, and corresponding resolution of imagery for each of tiles 128. In some embodiments, any of the size, position, and corresponding resolution of imagery for each of tiles 128 is determined by tile generator 122 based on gaze vector 136 and/or gaze error 126.

Processing circuitry 116 includes image renderer 124, according to some embodiments. In some embodiments, image renderer 124 is configured to receive tiles 128 from tile generator 122 and use tiles 128 to generate an image for display(s) 164. In some embodiments, image renderer 124 receives image data 132 and uses tiles 128 to display the image data on display(s) 164. In some embodiments, image renderer 124 receives tiles 128 and image data 132 and generates a rendered image 130 based on tiles 128 and image data 132. Image renderer 124 uses the size, shape, position, and corresponding resolution of each of tiles 128 to rasterize image data 132 to generate rendered image 130, according to some embodiments.

Image renderer 124 is a 3D image renderer or 2D image renderer, according to some embodiments. Image renderer 124 uses image related input data to process, generate and render display or presentation images to display or present on one or more display devices, such as via an HMD, according to some embodiments. Image renderer 124 generates or creates 2D images of a scene or view for display on display 164 and representing the scene or view in a 3D manner, according to some embodiments. The display or presentation data (e.g., image data 132) to be rendered includes geometric models of 3D objects in the scene or view, according to some embodiments. Image renderer 124 determines, computes, or calculates the pixel values of the display or image data to be rendered to provide the desired or predetermined 3D image(s), such as 3D display data for images 112 captured by the sensor 104, according to some embodiments. Image renderer 124 receives images 112, tiles 128, and head tracking data 150 and generates display images using images 112.

Image renderer 124 can render frames of display data to one or more displays 164 based on temporal and/or spatial parameters. Image renderer 124 can render frames of image data sequentially in time, such as corresponding to times at which images are captured by the sensors 104. Image renderer 124 can render frames of display data based on changes in position and/or orientation to sensors 104, such as the position and orientation of the HMD. Image renderer 124 can render frames of display data based on left-eye view(s) and right-eye view(s) such as displaying a left-eye view followed by a right-eye view or vice-versa.

Image renderer 124 can generate the display images using motion data regarding movement of the sensors 104a . . . n that captured images 112a . . . k. For example, the sensors 104a . . . n may change in at least one of position or orientation due to movement of a head of the user wearing an HMD that includes the sensors 104a . . . n (e.g., as described with reference to HMD system 200 of FIG. 2). Processing circuitry 116 can receive the motion data from a position sensor (e.g., position sensor 220 described with reference to FIG. 2). Image renderer 124 can use the motion data to calculate a change in at least one of position or orientation between a first point in time at which images 112a . . . k were captured and a second point in time at which the display images will be displayed, and generate the display images using the calculated change. Image renderer 124 can use the motion data to interpolate and/or extrapolate the display images relative to images 112a . . . k. Although image renderer 124 is shown as part of processing circuitry 116, the image renderer may be formed as part of other processing circuitry of a separate device or component, such as the display device, for example within the HMD.

System 100 can include one or more displays 164. The one or more displays 164 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the lens within the frame of the glasses or goggles. Displays 164 may have a refresh rate the same or different than a rate of refresh or frame rate of processing circuitry 116 or image renderer 124 or the sensors 104.

Referring now to FIG. 2, in some implementations, an HMD system 200 can be used to implement system 100. HMD system 200 can include an HMD body 202, a left sensor 104*a* (e.g., left image capture device), a right sensor 104*b* (e.g., right image capture device), and display 164. HMD body 202 can have various form factors, such as glasses or a headset. The sensors 104*a*, 104*b* can be mounted to or integrated in HMD body 202. The left sensor 104*a* can capture first images corresponding to a first view (e.g., left eye view), and the right sensor 104*b* can capture images corresponding to a second view (e.g., right eye view). HMD system 200 may also be a HWD system.

HMD system 200 can include a top sensor 104*c* (e.g., top image capture device). Top sensor 104*c* can capture images corresponding to a third view different than the first view or the second view. For example, top sensor 104*c* can be positioned between the left sensor 104*a* and right sensor 104*b* and above a baseline between the left sensor 104*a* and right sensor 104*b*. This can enable top sensor 104*c* to capture images with depth information that may not be readily available to be extracted from the images captured by left and right sensors 104*a*, 104*b*. For example, it may be difficult for depth information to be effectively extracted from images captured by left and right sensors 104*a*, 104*b* in which edges (e.g., an edge of a table) are parallel to a baseline between left and right sensors 104*a*, 104*b*. Top sensor 104*c*, being spaced from the baseline, can capture the third image to have a different perspective, and thus enable different depth information to be extracted from the third image, than left and right sensors 104*a*, 104*b*.

HMD system 200 can include processing circuitry 116, which can perform at least some of the functions described with reference to FIG. 1, including receiving sensor data from sensors 104*a*, 104*b*, and 104*c* as well as eye tracking sensors 104, and processing the received images to calibrate an eye tracking operation.

HMD system 200 can include communications circuitry 204. Communications circuitry 204 can be used to transmit electronic communication signals to and receive electronic communication signals from at least one of a client device 208 or a server 212. Communications circuitry 204 can include wired or wireless interfaces (e.g., jacks, antennas, transmitters, receivers, transceivers, wire terminals) for conducting data communications with various systems, devices, or networks. For example, communications circuitry 204 can include an Ethernet card and port for sending and receiving data via an Ethernet-based communications network. Communications circuitry 204 can communicate via local area networks (e.g., a building LAN), wide area networks (e.g., the Internet, a cellular network), and/or conduct direct communications (e.g., NFC, Bluetooth). Communications circuitry 204 can conduct wired and/or wireless communications. For example, communications circuitry 204 can include one or more wireless transceivers (e.g., a Wi-Fi transceiver, a Bluetooth transceiver, a NFC transceiver, a cellular transceiver). For example, communications circuitry 204 can establish wired or wireless connections with the at least one of the client device 208 or server 212. Communications circuitry 204 can establish a USB connection with the client device 208.

HMD system 200 can be deployed using different architectures. In some embodiments, the HMD (e.g., HMD body 202 and components attached to HMD body 202) comprises processing circuitry 116 and is self-contained portable unit. In some embodiments, the HMD has portions of processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of processing circuitry 116 that work in cooperation with or in conjunction with processing circuitry, or portions thereof, of a desktop computing device. In some embodiments, the HMD has portions of processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as image capture and rendering to display 164. The HMD can transmit and receive data with the client device 208 to leverage the client device 208's computing power and resources which may have higher specifications than those of the HMD.

Server 212 can be any type of form of computing device that provides applications, functionality or services to one or more client devices 208 or other devices acting as clients. In some embodiments, server 212 can be a client device 208. Server 212 can be deployed in a data center or cloud computing environment accessible via one or more networks. The HMD and/or client device 208 can use and leverage the computing power and resources of server 212. The HMD and/or client device 208 can implement any portion of the image and rendering processing pipeline described in connection with FIGS. 1 and 3. Server 212 can implement any portion of the image and rendering processing pipeline described in connection with FIGS. 1 and 3, and in some cases, any portions of the image and rendering processing pipeline not performed by client device 208 or HMD. Server 212 may be used to update the HMD and/or client device 208 with any updated to the applications, software, executable instructions and/or data on the HMD and/or client device 208.

System 200 can include a position sensor 220. The position sensor 220 can output at least one of a position or an orientation of the body 202. As the image capture devices 104*a*, 104*b*, 104*c* can be fixed to the body 202 (e.g., at predetermined locations relative to the position sensor 220), the position sensor 220 can output at least one of a position or an orientation of each sensor 104a, 104b, 104c. The position sensor 220 can include at least one of an inertial measurement unit (IMU), an accelerometer, a gyroscope, or a magnetometer (e.g., magnetic compass).

System 200 can include a varifocal system 224. Varifocal system 224 can have a variable focal length, such that varifocal system 224 can change a focus (e.g., a point or plane of focus) as focal length or magnification changes. Varifocal system 224 can include at least one of a mechanical lens, liquid lens, or polarization beam plate. In some embodiments, varifocal system 224 can be calibrated by processing circuitry 116 (e.g., by a calibrator), such as by receiving an indication of a vergence plane from a calibrator which can be used to change the focus of varifocal system 224. In some embodiments, varifocal system 224 can enable a depth blur of one or more objects in the scene by adjusting the focus based on information received from the calibrator so that the focus is at a different depth than the one or more objects.

In some embodiments, display 164 includes one or more waveguides. The waveguides can receive (e.g., in-couple) light corresponding to display images to be displayed by display 164 from one or more projectors, and output (e.g., out-couple) the display images, such as for viewing by a user of the HMD. The waveguides can perform horizontal or vertical expansion of the received light to output the display images at an appropriate scale. The waveguides can include one or more lenses, diffraction gratings, polarized surfaces, reflective surfaces, or combinations thereof to provide the display images based on the received light. The projectors can include any of a variety of projection devices, such as LCD, LED, OLED, DMD, or LCOS devices, among others, to generate the light to be provided to the one or more waveguides. The projectors can receive the display images from processing circuitry 116 (e.g., from image renderer 124). The one or more waveguides can be provided through a display surface (e.g., glass), which can be at least partially transparent to operate as a combiner (e.g., combining light from a real world environment around the HMD with the light of the outputted display images).

Display 164 can perform foveated rendering based on the calibrated eye tracking operation, which can indicate a gaze point corresponding to the gaze direction generated by the eye tracking operation. For example, processing circuitry 116 can identify at least one of a central region of the FOV of display 164 (e.g., a plurality of pixels within a threshold distance from the gaze point) peripheral region of the FOV of display 164 based on the gaze point (e.g., a peripheral region represented by a plurality of pixels of the display images that are within a threshold distance of an edge of the display images or more than a threshold distance from the gaze point). Processing circuitry 116 can generate the display images to have a less quality (e.g., resolution, pixel density, frame rate) in the peripheral region than in the central region, which can reduce processing demand associated with operation of HMD system 200.

Gaze Vector and Point of Interest

Referring now to FIGS. 3-5, the gaze vector is shown in greater detail, according to some embodiments. Gaze vector 136 as used by processing circuitry 116 is represented graphically in FIGS. 3-5 as gaze vector 302, according to some embodiments. It should be understood that while gaze vector 136 is represented in a spherical coordinate system, gaze vector 136 can also be represented in a Cartesian coordinate system, a polar coordinate system, a cylindrical coordinate system, etc., or any other coordinate system. Gaze vector 302 is used by processing circuitry 116 to determine a focal point or gaze location 402 of the user's eyes, according to some embodiments.

Referring particularly to FIG. 3, a spherical coordinate system includes gaze vector 302, and a user's eye (or eyes) 140. Eye 140 is shown as a centerpoint of the spherical coordinate system, and gaze vector 302 extends radially outwards from eye 140, according to some embodiments. In some embodiments, a direction of gaze vector 302 is defined by one or more angles, shown as angle $\theta_1$ and angle $\theta_2$. In some embodiments, angle $\theta_1$ represents an angular amount between gaze vector 302 and a vertical axis 304. In some embodiments, angle $\theta_2$ represents an angular amount between gaze vector 302 and a horizontal axis 306. In some embodiments, vertical axis 304 and horizontal axis 306 are substantially perpendicular to each other and both extend through eye 140.

In some embodiments, eye tracker 118 of processing circuitry 116 is configured to determine values of both angle $\theta_1$ and angle $\theta_2$ based on eye tracking data 148. Eye tracker 118 can determine the values of angles $\theta_1$ and $\theta_2$ for both eyes 140, according to some embodiments. In some embodiments, eye tracker 118 determines the values of angles $\theta_1$ and $\theta_2$ and provides the angles to error manager 120 and/or tile generator 122 as gaze vector 136.

Referring particularly to FIGS. 4 and 5 gaze vector 302 can be used to determine a location of a point of interest, a focal point, a gaze point, a gaze location, a point, etc., shown as gaze location 402. Gaze location 402 has a location on display 164, according to some embodiments. In some embodiments, gaze location 402 has an x location and a y location (e.g., a horizontal and a vertical location) on display 164. In some embodiments, gaze location 402 has a location in virtual space, real space, etc. In some embodiments, gaze location 402 has a two dimensional location. In some embodiments, gaze location 402 has a three-dimensional location. Gaze location 402 can have a location on display 164 relative to an origin or a reference point on display 164 (e.g., a center of display 164, a corner of display 164, etc.). Gaze location 402 and gaze vector 302 can be represented using any coordinate system, or combination of coordinate systems thereof. For example, gaze location 402 and/or gaze vector 302 can be defined using a Cartesian coordinate system, a polar coordinate system, a cylindrical coordinate system, a spherical coordinate system, a homogeneous coordinate system, a curvilinear coordinate system, an orthogonal coordinate system, a skew coordinate system, etc.

In some embodiments, tile generator 122 and/or eye tracker 118 are configured to use a distance d between the user's eye 140 and display 164. The distance d can be a known or sensed distance between the user's eye 140 and display 164, according to some embodiments. For example, sensors 104 can measure, detect, sense, identify, etc., the distance d between the user's eye 140 and display 164. In some embodiments, the distance d is a known distance based on a type or configuration of the HMD.

The distance d and the angles $\theta_1$ and $\theta_2$ can be used by eye tracker 118 to determine gaze vector 302/136. In some embodiments, eye tracker 118 uses the distance d and the angles $\theta_1$ and $\theta_2$ to determine the location of gaze location 402. In some embodiments, eye tracker 118 provides the distance d and the angles $\theta_1$ and $\kappa_2$ to tile generator 122. Tile generator 122 uses the distance d and the angles $\theta_1$ and $\theta_2$ to determine the location of gaze location 402 relative to a reference point on display 164.

FIG. 4 is a top view of display 164 and the user's eye 140, according to some embodiments. FIG. 4 shows the angle $\theta_1$, according to some embodiments. Likewise, FIG. 5 is a side view of display 164 and the user's eye 140 and shows the angle $\theta_2$, according to some embodiments. Tile generator 122 and/or eye tracker 118 use the distance d and the angles $\theta_1$ and $\theta_2$ to determine the position/location of gaze location 402, according to some embodiments. In some embodiments, tile generator 122 uses the position/location of gaze location 402 to define tiles 128. It should be understood that while display 164 is shown as a generally flat display screen, in some embodiments, display 164 is a curved, arcuate, etc., display screen. A rectangular display screen is shown for ease of illustration and description only. Accordingly, all references to "local positions," "local coordinates," "Cartesian coordinates," etc., of display 164 may refer to associated/corresponding angular values of angle $\theta_1$ and/or angle $\theta_2$.

Tile Definition

Referring to FIG. 6, display 164 is shown to include tiles 602, according to some embodiments. In some embodiments, tiles 602 are defined by tile generator 122 based on the location/position of gaze location 402. Gaze location 402 represents an approximate location that the user is viewing, according to some embodiments. In some embodiments, gaze location 402 represents the point or location that the user's gaze is directed towards.

Display 164 includes tiles 602 having a width w and a height h, according to some embodiments. In some embodiments, the width w is referred to as a length along a central horizontal axis of display 164 (e.g., a straight horizontal axis if display 164 is straight, a curved horizontal axis if display 164 is curved). Likewise, the height h is referred to as a height along a vertical axis of display 164 (e.g., a straight vertical axis if display 164 is straight, a curved vertical axis if display 164 is curved about horizontal axis 306). In some embodiments, the width w and the height h are angular values of angle $\theta_1$ and $\theta_2$ for a given distance from the user's eye 140. For example, the width w of tiles 602 may be an 11 degrees (e.g., an amount of 11 degrees for angle $\theta_1$ from opposite sides of tile 602), and the height h of tiles 602 may be 17 degrees (e.g., an amount of 17 degrees for angle $\theta_2$ from top and bottom sides of tile 602).

In some embodiments, each of tiles 602 have an area A=wh. In some embodiments, each of tiles 602 includes a collection of pixels that display a portion of an image that is displayed on display 164 to the user. Tiles 602 collectively display the image to the user on display 164, according to some embodiments. The image can be a rendered image of three dimensional objects, particles, characters, terrain, maps, text, menus, etc. In some embodiments, the image is a virtual reality image. In some embodiments, the image is an augmented reality image (e.g., imagery is overlaid or projected over a real-world image). For example, if display 164 is a display of a HMD virtual reality system, the image can be a representation of a virtual reality, a virtual space, a virtual environment, etc. Likewise, if display 164 is a display of a HMD augmented reality system, the image can be a representation of projected objects, characters, particles, text, etc., having a location in virtual space that matches or corresponds or tracks a location in real space.

Referring still to FIG. 6, display 164 includes a first set of tiles 602a, a second set of tiles 602b, and a third set of tiles 602c, according to some embodiments. In some embodiments, the resolution of tiles 602c is greater than the resolution of tiles 602b, and the resolution of tiles 602b is greater than the resolution of tiles 602a. In some embodiments, processing power of processing circuitry 116 can be reduced by decreasing the resolution of tiles 602 that are in the user's peripheral view. For example, tiles 602 that are currently being viewed out of the corner of the user's eye may be rendered at a lower resolution without the user noticing the reduced or lower resolution.

Tile generator 122 determines which tiles 602 should be rendered by image renderer 124 at a higher resolution, according to some embodiments. In some embodiments, tile generator 122 includes a predetermined number of tile groups with ascending or descending resolutions. Tile generator 122 can monitor the location/position of gaze location 402 in real-time (e.g., before every frame is rendered and provided to the user on display 164) to determine which of tiles 602 should be rendered at the highest resolution and to determine which of tiles 602 should be rendered in a lower resolution to save processing power of processing circuitry 116. In some embodiments, tile generator 122 determines that tiles 602 which correspond to the position/location of gaze location 402 should have the highest resolution. For example, if gaze location 402 is located within a specific tile 602, tile generator 122 can determine that the specific tile 602 should have the highest resolution or should be associated with the highest resolution set of tiles 602. In some embodiments, tile generator 122 also determines that tiles 602 that are adjacent, neighboring, or nearby (e.g., directly adjacent) the specific tile 602 should also be rendered with the same high resolution (e.g., tiles 602a). In some embodiments, tile generator 122 determines that tiles 602 that are adjacent, next to, neighbor, nearby, etc., the high resolution tiles 602 should be rendered at a medium resolution (e.g., tiles 602b). Tile generator 122 can determine that all other tiles 602 of display 164 which are in the user's peripheral view should be rendered at the low resolution (e.g., tiles 602c).

In some embodiments, tile generator 122 adjusts which of tiles 602 should be rendered at the high resolution, the medium resolution, and the lower resolution. For example, tile generator 122 can re-assign tiles 602 to redefine the various tile groups in response to the location/position of gaze location 402 changing. For example, as shown in FIGS. 6 and 7, the location/position of gaze location 402 on display 164 changes as the user re-directs their gaze, according to some embodiments. Tile generator 122 redefines the first set of tiles 602a so that tiles 602 that are near or at the location/position of gaze location 402 are rendered at the highest quality/resolution, according to some embodiments. Likewise, tile generator 122 redefines the second set of tiles 602b and the third set of tiles 602c to account for the shift in the location/position of gaze location 402. In this way, tile generator 122 can redefine the resolution of each of tiles 602 in response to the user changing or redirecting their gaze. In some embodiments, tile generator 122 uses gaze vector 302 in real-time to re-calculate the location/position of gaze location 402. Tile generator 122 uses the re-calculated or updated location/position of gaze location 402 to redefine or reassign tiles 602 (e.g., to re-determine positions, sizes, shapes, definitions, locations, resolutions, etc., of tiles 602).

Figure 8:
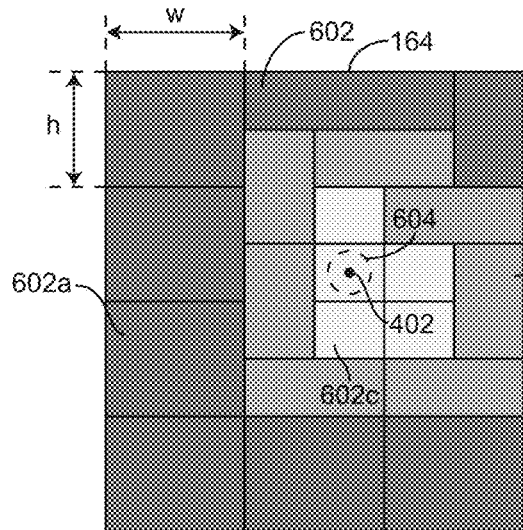
FIG. 8 is the tiled display screen of FIG. 6 with foveated rendering for a first gaze position error, according to some embodiments.
Figure 9:
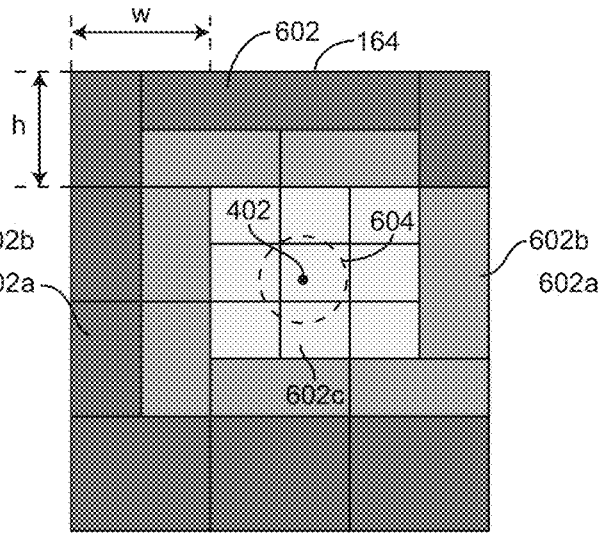
FIG. 9 is the tiled display screen of FIG. 6 with foveated rendering for a second gaze position error, according to some embodiments.

Referring now to FIGS. 8 and 9, tile generator 122 uses gaze error 126 to adjust or redefine tiles 602, according to some embodiments. Gaze error 126 is represented by error 604, according to some embodiments. Error 604 indicates an area or range of locations that gaze location 402 may be located, according to some embodiments. In some embodiments, error 604 is determined based on eye tracking data 148 by error manager 120. In some embodiments, error 604 is used by tile generator 122 to determine if the user's gaze may be directed to an area or location other than the location/position of gaze location 402. Error 604 represents an area that gaze location 402 may be located, corresponding to an error of angle $\theta_1$ and angle $\theta_2$, according to some embodiments. For example, if angle $\theta_1$ has a high amount of error, error 604 (represented by a two-dimensional area on display 164) may have a larger height, according to some embodiments. Likewise, if angle $\theta_2$ has a high amount of error, error 604 may have a larger width, according to some embodiments. Error 604 indicates angular jitter, wobble, measurement uncertainty, etc., of gaze vector 302 (and/or gaze location 402) about vertical axis 304 and/or horizontal axis 306, according to some embodiments.

If error 604 increases, a corresponding number of tiles 602 that the user's gaze may be directed towards also increases, according to some embodiments. In response to error 604 increasing, tile generator 122 can redefine the first set of tiles 602a, the second set of tiles 602b, and the third set of tiles 602c to account for the increased error 604. For example, as shown in FIG. 8, five tiles 602 are included in the first set of tiles 602a and are rendered at the high resolution, according to some embodiments. However, as error 604 increases (shown in FIGS. 8 and 9), tile generator 122 includes additional tiles 602 to ensure that the user's gaze is not directed towards a lower resolution tile 602, according to some embodiments. Error manager 120 can receive eye tracking data 148 in real-time, determine gaze error 126, translate gaze error 126 (e.g., the error of angle $\theta_1$ and/or angle $\theta_2$) to a range of positions/locations on display 164 (shown as error 604), and provide error 604 and/or gaze error 126 to tile generator 122. Tile generator 122 defines the size, area, number of pixels, location, resolution, etc., of each tile 602 based on gaze error 126 (e.g., based on error 604), according to some embodiments. In some embodiments, tile generator 122 provides any of the defined information regarding tiles 602 to image renderer 124. In some embodiments, tile generator 122 uses both the location/position of gaze location 402 as well as error 604 to define tiles 602. In some embodiments, the positions, locations, sizes, etc., of tiles 602 are predefined or predetermined, and tile generator 122 defines a corresponding resolution for each tile 602 based on the location/position of gaze location 402 as well as error 604.

For example, if angle $\theta_1$ has an error $\Delta\theta_1$ and angle $\theta_2$ has an error $\Delta\theta_2$, error manager 120 determines an error $\Delta x$ in the x position of gaze location 402, and an error $\Delta y$ in the y position of gaze location 402, according to some embodiments. In some embodiments, the error $\Delta x$ and the error $\Delta y$ define error 604. In some embodiments, error manager 120 translates the uncertainty, error, range of values, etc., of the angles $\theta_1$ and $\theta_2$ to errors $\Delta x$ and $\Delta y$ in the x direction and they direction of display 164 to define error 604.

In some embodiments, error 604 has the shape of a circle (as shown in FIGS. 6-15). In some embodiments, error 604 has the shape of an ellipse, a square, a rectangle, etc. Tile generator 122 can identify, based on the location/position of gaze location 402 and error 604, which tiles 602 lie within error 604 (e.g., if tiles 602 have predetermined/predefined locations and sizes) and assigns these tiles 602 with high resolution rendering. If error 604 increases, additional tiles 602 that now are within error 604 can be re-assigned by tile generator 122 to render with high resolution. Likewise, if error 604 decreases, tiles 602 that are not within error 604 can be re-assigned by tile generator 122 to render with lower resolution. In this way, foveated rendering can be achieved that accounts for error in the gaze vector, gaze direction, point of interest, focal point, etc., of the user.

Figure 10:
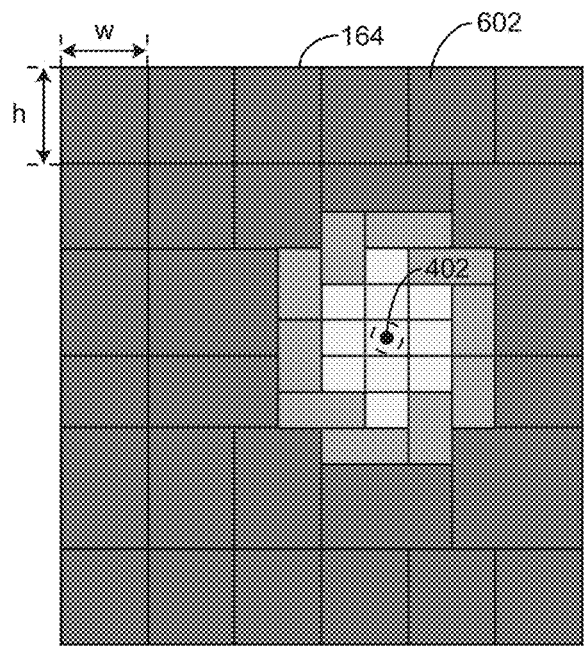
FIG. 10 is a tiled display screen with smaller tiles than the display screen of FIGS. 6-9 and foveated rendering, according to some embodiments.
Figure 11:
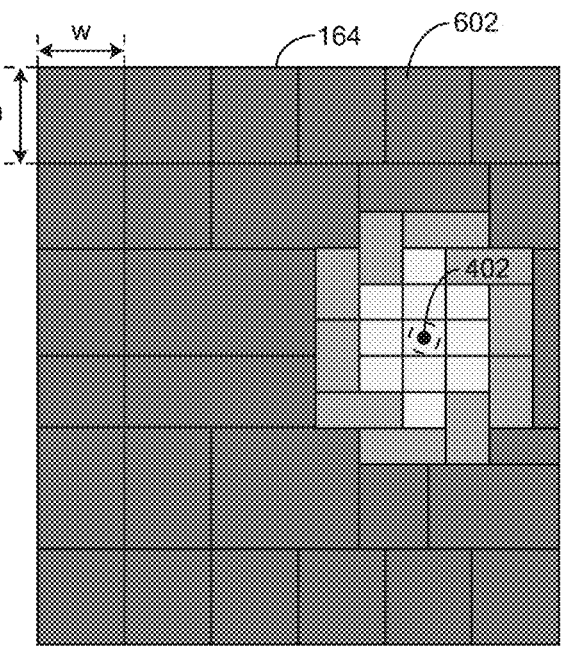
FIG. 11 is the tiled display screen of FIG. 10 with foveated rendering after a user's gaze has shifted to a new location, according to some embodiments.

In some embodiments, display 164 includes smaller tiles 602 as shown in FIGS. 10-11. The height h and width w of tiles 602 are defined by tile generator 122 based on display capabilities of display 164, according to some embodiments. In some embodiments, the height h and width w of tiles 602 are predefined for display 164. For example, displays that are capable of displaying higher resolution images (e.g., displays with more pixels) can have additional tiles 602 compared to displays with lower resolution (e.g., less pixels). Tile generator 122 can dynamically re-define positions, sizes, shapes, etc., of each of tiles 602 and corresponding render/resolution qualities in response to gaze location 402 shifting (e.g., shifting to the right as shown in FIGS. 10-11).

Figure 12:
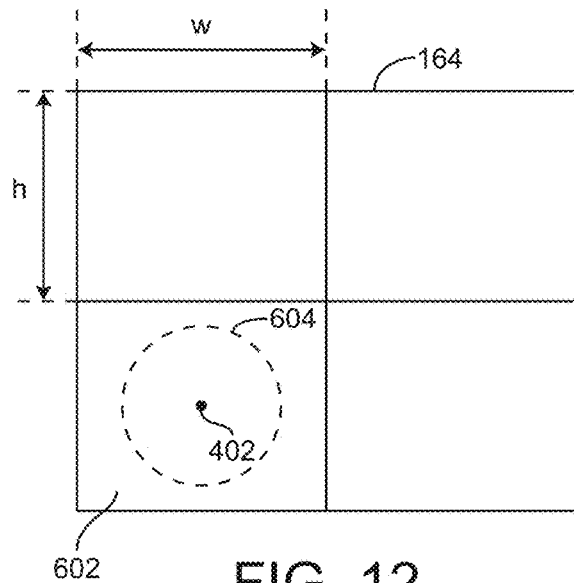
FIG. 12 is a portion of a tiled display screen with a user's gaze centered at a first tile, according to some embodiments.
Figure 13:
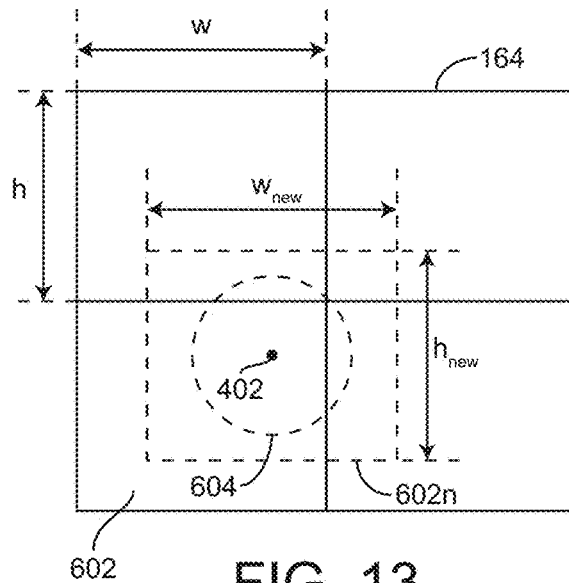
FIG. 13 is the portion of the tiled display screen of FIG. 12 after the user's gaze has shifted to a new location near a tile border and a new tile has been defined, according to some embodiments.

Referring particularly to FIGS. 12-13, gaze location 402 may sometimes remain within a corresponding tile 602, according to some embodiments. However, gaze location 402 can also move near an intersection of multiple tiles 602. For example, if gaze location 402 moves to the intersection between the four tiles 602 shown in FIG. 12, a situation arises in which tile generator 122 must determine which of the four tiles 602 should be rendered in the high resolution, according to some embodiments. Tile generator 122 can render all four tiles 602 in the high resolution, however, this may not necessarily be the most processing efficient solution.

In cases when gaze location 402 moves near an intersection of one or more tiles 602, tile generator 122 can redefine a layout, size, position, arrangement, etc., of tiles 602. In some embodiments, tile generator 122 redefines the layout, size, position, arrangement, etc., of tiles 602 in response to gaze location 402 moving a predetermined distance from a centerpoint of a tile 602. For example, if gaze location 402 is within a predetermined distance from the centerpoint of the bottom left tile 602 as shown in FIG. 12, tile generator 122 maintains the current layout, size, position, arrangement, etc., of tiles 602, according to some embodiments. However, if gaze location 402 moves the predetermined distance or more from the centerpoint of the bottom left tile 602 shown in FIG. 12, tile generator 122 redefines the layout, size, position, location, arrangement, etc., of tiles 602, according to some embodiments. In some embodiments, the predetermined distance is zero (e.g., if gaze location 402 moves from the centerpoint of tile 602 any amount, tile generator 122 redefines tiles 602). In some embodiments, the predetermined distance is a number of pixels, an angular amount for a given distance from the user's eye 140 (e.g., an amount of angular rotation about either vertical axis 304 and/or horizontal axis 306), a distance (e.g., in x and y directions) on display 164, etc. In some embodiments, the predetermined distance is a portion of, a percentage of, or is proportional to a height h or a width w of a tiles 602 that gaze location 402 is currently within. The predetermined distance includes both x and y components or corresponding angular amounts, according to some embodiments.

In some embodiments, tile generator 122 redefines tiles 602 in response to an intersection (e.g., a border, a boundary, etc.) of one or more tiles 602 lying within error 604. For example, gaze location 402 as shown in FIG. 12 includes error 604, but none of the intersections of adjacent tiles 602 lie within error 604, according to some embodiments. However, when gaze location 402 moves to the position shown in FIG. 13, the intersections or borders of adjacent tiles 602 are now within error 604, according to some embodiments. In response to gaze location 402 moving off center of a corresponding tile 602 that gaze location 402 is currently within, or in response to an intersection, border, boundary, etc., of the corresponding tile 602 lying within error 604, tile generator 122 redefines the layout, size, position, arrangement, etc., of tiles 602, according to some embodiments. Tile generator 122 redefines the layout, size, positions, arrangements, etc., of tiles 602 such that gaze location 402 is at a centerpoint of a corresponding tile 602, according to some embodiments. Advantageously, this allows processing circuitry 116 to provide high detail or high resolution imagery on new tile 602*n* instead of displaying high detail/high resolution imagery on all four of tiles 602, thereby decreasing processing power requirements.

In the example shown in FIGS. 12-13, tile generator 122 defines a new tile 602*n* that is centered about the location/position of gaze location 402, according to some embodiments. Tile generator 122 assigns new tile 602*n* the highest resolution for rendering, according to some embodiments.

In some embodiments, tile generator 122 generates, defines, determines definitions of, etc., tiles 602 for the rest of display 164 based on new tile 602*n*. Tile generator 122 uses any of the techniques, functionality, etc., described in greater detail above with reference to FIGS. 6-11 to assign or map resolution qualities to the rest of tiles 602 that surround new tile 602*n* and fill out the entirety of display 164, according to some embodiments. New tile 602*n* is defined as being positioned centrally at gaze location/position 402, according to some embodiments. In some embodiments, a size of new tile 602*n* is very small compared to gaze angles $\theta_1$ and/or $\theta_2$ or gaze angles $\theta_1$ and/or $\theta_2$ are very large compared to the size of new tile 602*n*. If the size of new tile 602*n* is very small compared to gaze angles $\theta_1$ and/or $\theta_2$, new tile 602*n* can include multiple tiles (e.g., 2 tiles, 4 tiles, etc.). In some embodiments, new tile 602*n* does not have a fixed size or ratio between height and width (e.g., new tile 602*n* can be a square tile or a rectangular tile). In some embodiments, surrounding tiles 602 can be different shapes and/or different sizes (e.g., differently sized squares and/or rectangles).

In some embodiments, tile generator 122 defines new tile 602*n* having height $h_{new}$ and width $w_{new}$ that are the same as height h and width w of previously defined tiles 602. In some embodiments, the height $h_{new}$ and width $w_{new}$ of new tile 602*n* are predetermined values. In some embodiments, tiles 602 all have uniform height h and width w. In some embodiments, tiles 602 have non-uniform heights h and widths w. In some embodiments, the height h and/or width w of tiles 602 are defined by tile generator 122 based on error 604 and/or based on motion of gaze location 402. For example, if error 604 is large, the height $h_{new}$ and width $w_{new}$ of new tile 602*n* may also increase, according to some embodiments. In some embodiments, the height $h_{new}$ and the width $w_{new}$ of new tile 602*n* is dynamically related to any of error 604, a rate of change of error 604, a speed of motion of gaze location 402, etc.

For example, the height $h_{new}$ of new tile 602*n* (or any other tiles 602) is related to a vertical error component of error 604:

$$h = f(e_{vertical})$$

where h is the height of new tile 602*n* (or any other tile), and $e_{vertical}$ is a vertical error component of error 604 (e.g., in Cartesian coordinates, in terms of $\theta_2$, etc.) according to some embodiments. For example, the height h of new tile 602*n* or any other tile may be:

$$h = c * e_{vertical}$$

where c is a constant (e.g., an integer such as 1, 2, 3, 4, . . . , or any other non-integer value such as 1.5, 2.5, etc.).

The height $h_{new}$ of new tile 602*n* (or any other tiles 602) is related to a rate of change of the vertical error component of error 604:

$$h = f(\dot{e}_{vertical})$$

according to some embodiments.

The height $h_{new}$ of new tile 602*n* is related to the vertical position of gaze location 402 (described in greater detail below with reference to FIG. 21):

$$h = f(p_{vertical})$$

where $p_{vertical}$ is a vertical position of gaze location 402 (e.g., a y-position on display 164, a value of angle $\theta_2$, etc.) according to some embodiments.

The height $h_{new}$ of new tile 602*n* is related to a rate of change the vertical position of gaze location 402:

$$h = f(\dot{p}_{vertical})$$

where $\dot{p}_{vertical}$ is a rate of change (e.g., a time rate of change) of the vertical position of gaze location 402 (e.g., a y-position on display 164, a value of angle $\theta_2$, etc.) according to some embodiments.

In some embodiments, the height h of any of tiles 602 (e.g., $h_{new}$, the height of new tile 602*n*, or the height of any other tile 602) is related to any combination of $e_{vertical}$, $\dot{e}_{vertical}$, $p_{vertical}$, and/or $\dot{p}_{vertical}$. For example, the height h can be related to or determined by tile generator 122 using a function, equation, set of equations, etc., such as;

$$h = f(e_{vertical}, \dot{e}_{vertical}, \dot{p}_{vertical}, p_{vertical})$$

according to some embodiments.

Likewise, the width $w_{new}$ of new tile 602*n* (or any other tiles 602) is related to a horizontal error component of error 604:

$$w = f(e_{horizontal})$$

where w is the width of new tile 602*n* (or any other tile), and $e_{horizontal}$ is a horizontal component of error 604 (e.g., in Cartesian coordinates, in terms of $\theta_1$, etc.) according to some embodiments. For example, the width h of new tile 602*n* or any other tile may be:

$$w = c * e_{horizontal}$$

where c is a constant (e.g., an integer such as 1, 2, 3, 4, . . . , or any other non-integer value such as 1.5, 2.5, etc.).

The width $w_{new}$ of new tile 602*n* (or any other tiles 602) is related to a rate of change (e.g., a time rate of change) of the horizontal component of error 604:

$$w = f(\dot{e}_{horizontal})$$

according to some embodiments.

The width $w_{new}$ of new tile 602*n* is related to the horizontal position of gaze location 402 (described in greater detail below with reference to FIG. 21):

$$h = f(p_{horizontal})$$

where $p_{horizontal}$ is a horizontal position of gaze location 402 (e.g., an x-position on display 164, a value of angle $\theta_1$, etc.) according to some embodiments.

The width $w_{new}$ of new tile 602*n* is related to a rate of change the horizontal position of gaze location 402:

$$h = f(\dot{p}_{horizontal})$$

where $\dot{p}_{horizontal}$ is a rate of change (e.g., a time rate of change) of the horizontal position of gaze location 402 (e.g., an x-position on display 164, a value of angle $\theta_1$, etc.) according to some embodiments.

In some embodiments, the width w of any of tiles 602 (e.g., $w_{new}$, the height of new tile 602n, or the height of any other tile 602) is related to any combination of $e_{horizontal}$, $\dot{e}_{horizontal}$, $p_{horizontal}$, and/or $\dot{p}_{horizontal}$. For example, the width w can be related to or determined by tile generator 122 using a function, equation, set of equations, etc., such as;

$$w = f(e_{horizontal}, \dot{e}_{horizontal}, p_{horizontal}, \dot{p}_{horizontal})$$

according to some embodiments.

In this way, tile generator 122 dynamically redefines the size, shape, dimensions, height, width, arrangement, layout, resolution, etc., of tiles 602 to maintain gaze location 402 within a corresponding tile 602 or to maintain gaze location 402 at a centerpoint of the corresponding tile 602, according to some embodiments. Advantageously, tile generator 122 redefines all tiles 602 that are used to render images on display 164 and dynamically provides foveated rendering, according to some embodiments. Tile generator 122 facilitates reducing processing power of processing circuitry 116 by assigning lower resolution rendering to tiles 602 that are in the user's peripheral view, according to some embodiments. However, tiles 602 that are at, adjacent, near, neighboring, etc., gaze location 402 are rendered in higher quality, according to some embodiments.

In some embodiments, tile generator 122 stores multiple layouts of tiles 602 that are predetermined or predefined in a database for multiple gaze positions/locations 402. For example, tile generator 122 can store a layout of tiles 602 that are optimized to eye tracking performance across all gaze angles. In some embodiments, tile generator 122 uses the predetermined/predefined layouts dynamically. For example, if gaze location 402 is at a first point or in a first area, tile generator 122 can retrieve and use a corresponding layout of tiles 602. Likewise, if gaze location 402 changes to a second point or a second area, tile generator 122 can retrieve and use a different corresponding layout of tiles 602.

In some embodiments, tile generator 122 generates transitional tiles 602 between tiles 602 with different render qualities. The transitional tiles 602 may be smaller and may provide imagery at intermediate qualities. For example, if a low quality tile 602 is directly adjacent a high quality tile 602, transitional tiles 602 or superpixels can be generated by tile generator 122 that progressively increase from the quality of the low quality tile to the quality of the high quality tile. In some embodiments, the transitional tiles 602 progressively increase in quality to facilitate ensuring that the user does not notice the transition between render qualities on adjacent tiles 602 with different render qualities. For example, the transitional tiles 602 can be used to provide various levels of progressively increasing or decreasing intermediate image quality between tiles 602 with different qualities. Tile generator 122 can identify tiles 602 that are adjacent each other with significantly different image quality (e.g., high image quality and low image quality) and generate or define the transitional tiles 602 to provide various levels of image/render quality/resolution therebetween (e.g., several levels of image quality between high image quality and low image quality). Advantageously, the transitional tiles 602 can reduce aliasing between tiles 602 with different image qualities.

Figure 14:
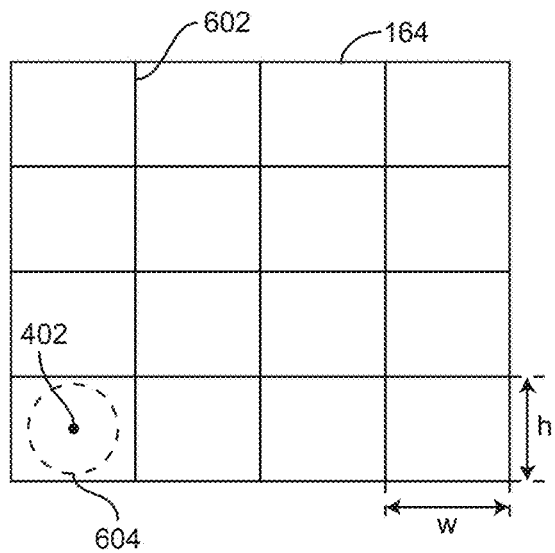
FIG. 14 is the portion of the tiled display screen of FIG. 12 with smaller gaze position error and smaller tiles, according to some embodiments.
Figure 15:
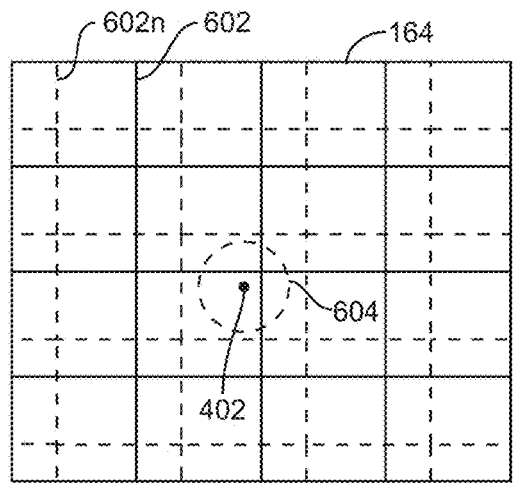
FIG. 15 is the portion of the tiled display screen of FIG. 14 after the user's gaze has shifted to a new location near a tile border and new tiles have been defined to account for the shifted user's gaze, according to some embodiments.

Referring to FIGS. 14-15, another example of the dynamic definition and generation of tiles 602 is shown, according to some embodiments. The example shown in FIGS. 14-15 is for a different display 164 that has a different size and/or resolution as display 164 in FIGS. 12-13, according to some embodiments. In some embodiments, the height h and width w of tiles 602 are defined by tile generator 122 independently. In some embodiments, a proportion or ratio between the height h and width w of tiles 602 is uniform (e.g., all tiles 602 have a h:w ratio of 1:1, all tiles 602 have a h:w ratio of 1:1.618, etc.). In some embodiments, for a same display 164 as the display 164 shown in FIGS. 14-15, a size of tiles 602 is the same or has a same area. In this way, higher resolution tiles can still hold a same amount of samples/pixels to provide high quality imagery. For lower resolution tiles, pixels may be skipped horizontally or vertically.

In response to gaze location 402 moving from the position shown in FIG. 14 to the position shown in FIG. 15 (e.g., near the intersection between four tiles 602), tile generator 122 defines a new arrangement, layout, size, etc., of tiles 602, shown as new tiles 602n, according to some embodiments. New tiles 602n are shown in dashed lines, with previously used tiles 602 shown in solid lines in FIG. 15, according to some embodiments. It should be noted that tile generator 122 defines new tiles 602n such that gaze location 402 is at a centerpoint of a corresponding new tile 602n, according to some embodiments. In some embodiments, tile generator 122 defines new tiles 602n such that error 604 is completely within a single new tile 602n that gaze location 402 is within. In some embodiments, tile generator 122 first defines the new tile 602n centered about the location/position of gaze location 402. In some embodiments, tile generator 122 proceeds to generating, defining, etc., additional tiles to fill out display 164 in response to defining the first new tile 602n that is centered about the location/position of gaze location 402. Tile generator 164 first defines the layout, arrangement, sizes, boundaries, intersections, etc., of new tiles 602n, then proceeds to assign rendering resolutions to each of new tiles 602n, according to some embodiments. In some embodiments, tile generator 164 provides the definitions of new tiles 602n and corresponding render resolutions of each of new tiles 602n to image renderer 124.

In some embodiments, tile generator 122 temporarily decreases or increases the sizes of tiles 602 prior to updating/redefining tiles 602 (e.g., prior to processing circuitry 116 using new tile 602n as opposed to the old tiles 602). For example, tile generator 122 can temporarily adjust (e.g., increase or decrease) the height h and/or width w of tiles 602 near or at gaze location 402 before new tile 602n is used to provide imagery to the user, according to some embodiments. Advantageously, this reduces the likelihood that the user will notice the change in tiles 602 (e.g., the repositioning, redefinition, resizing, etc., of tiles 602) and facilitates a seamless transition from the old tiles 602 to new tiles 602n.

It should be understood that tile generator 122 can dynamically update any of the arrangement, mapping, size, dimensions, corresponding resolutions, etc., of any of tiles 602, according to some embodiments. In some embodiments, tile generator 122 dynamically updates any of the arrangement, mapping, size, dimensions, corresponding resolutions, etc., of any of tiles 602 independently. In some embodiments, tile generator 122 dynamically updates or redefines tile 602 in response to changes in the location/position of gaze location 402 (or gaze vector 302), changes in the user's gaze, changes in gaze vector 302, changes in a focal point, changes in error 604, changes in errors associated with angles $\theta_1$ and $\theta_2$, changes in errors associated with gaze vector 302 (and/or gaze location 402), etc. In some embodiments, tile generator 122 dynamically updates or redefines tiles 602 prior to rendering and displaying a new frame of imagery on display 164.

Tiling Based on Lens Regions

Figure 21:
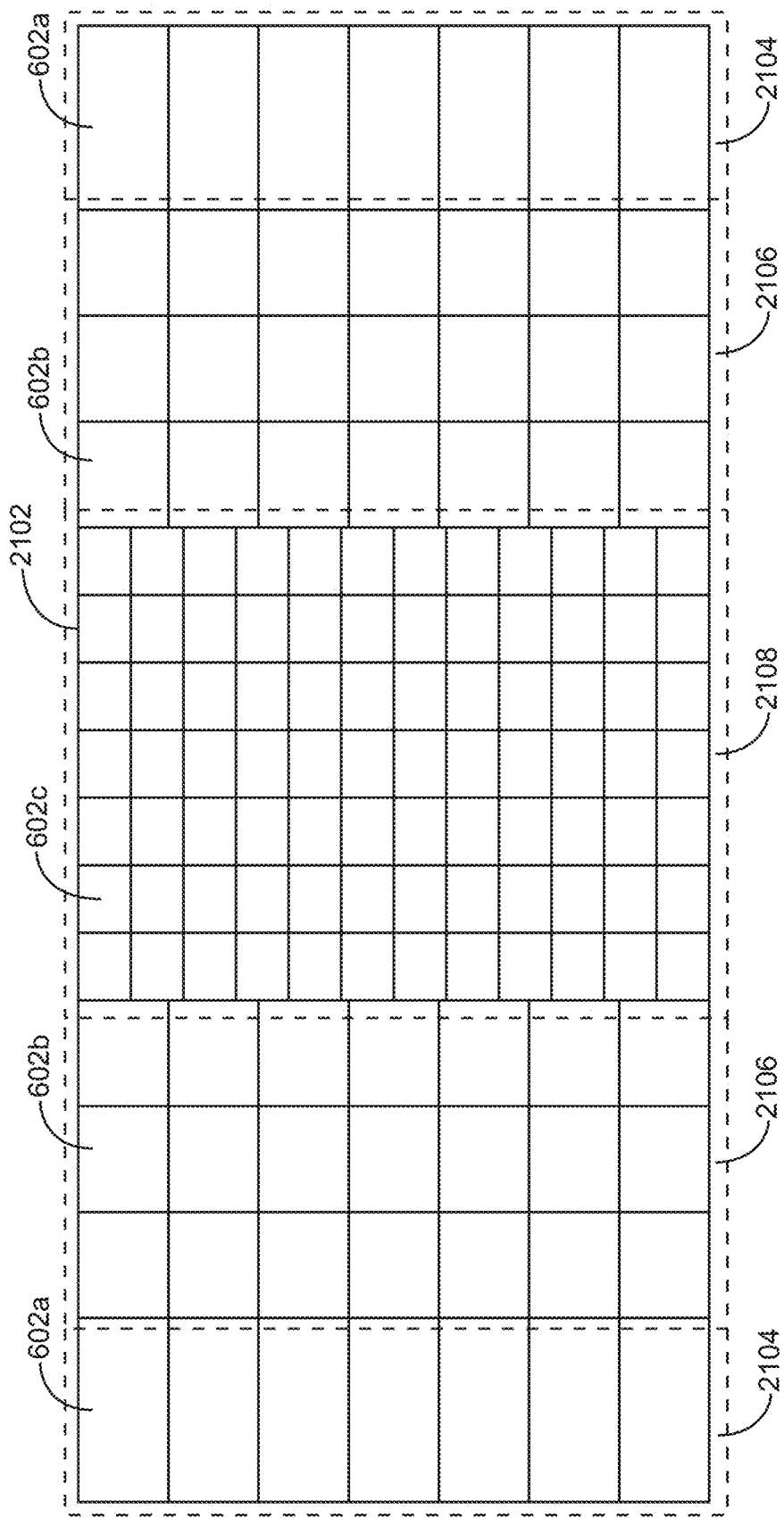
FIG. 21 is a front view of a lens of a display with various image quality regions, according to some embodiments.

Referring now to FIG. 21, a front view of a curved lens 2102 of display 164 is shown, according to some embodiments. Lens 2102 can include various quality regions, according to some embodiments. In some embodiments, the quality of regions 2104-2108 may vary based on the direction of gaze vector 302 (or the location of gaze location 402) or due to manufacturing and image displaying capabilities of lens 2102 and/or display 164. In some embodiments, regions 2104-2108 of lens 2102 have different values of a modulation transfer function (MTF). MTF values range from 1 to 0, with an MTF value of 1 indicating perfect contrast preservation, and lower MTF values indicating deteriorated contrast preservation. In addition, off-axis MTF sagittal and tangential components may have different values. For example, sagittal component of MTF could be worse than tangential in a Fresnel lens. In this case, a foveated tile can be made smaller in a sagittal direction and larger in a tangential direction to improve performance.

For example, center region 2108 may have an MTF value between 0.7 and 1, medial regions 2106 may have MTF values between 0.7 and 0.4, and outer regions 2104 of lens 2102 may have MTF values less than 0.4. In some embodiments, areas or regions of lens 2102 that are closer to the center of lens 2102 have higher MTF values, with regions or areas that are farther from the center of lens 2102 have lower MTF values.

For example, if certain regions of lens 2102 are viewed at a more tangential angle, the image quality may decrease due to the tangential viewing angle (the lower MTF values), according to some embodiments. FIG. 21 represents the case when the user is looking directly ahead towards a center of lens 2102, according to some embodiments. In this case, a center region 2108 of lens 2102 is being viewed at a more perpendicular angle than regions 2106 and regions 2104, according to some embodiments. Center region 2108 of lens 2102 may have the highest quality due to the viewing angle (e.g., the most perpendicularly viewed area) and image displaying capabilities of lens 2102.

Tile generator 122 can identify various quality regions of lens 2102 and adjust the size, height, width, number of tiles 602, etc., for the various regions of lens 2102, according to some embodiments. In some embodiments, the height h and width w of tiles 602 are generated/defined by tile generator 122 based on an MTF value of a corresponding region or area of lens 2102. In some embodiments, more tangential or outer regions 2104 of lens 2102 (e.g., a left most region, a right most region, an upper most region, a lower most region, etc.) have lower quality (e.g., lower MTF values), and therefore tile generator 122 determines that larger tiles 602a should be defined/generated for outer regions 2104 (or tiles 602 with a lower image quality). Likewise, tile generator 122 can identify that central region 2108 has the best capability for displaying high resolution/high detail/high quality images (e.g., the highest MTF values), according to some embodiments. Tile generator 122 can generate smallest tiles 602c for central region 2108, since central region 2108 is capable of being viewed the most perpendicularly (and has the highest MTF values), according to some embodiments. Medial regions 2106 are between central region 2108 and outer regions 2104 and can have medium sized tiles 602b to provide medium quality imagery to the user, according to some embodiments.

In general, the height h of tiles 602 can be directly proportional to a corresponding MTF value at the particular location of lens 2102 that the tile 602 will be displayed:

$$h \propto MTF$$

according to some embodiments. Likewise, the width w of tiles 602 can be directly proportional to the corresponding MTF value at the particular location of lens 2102 that the tile 602 will be displayed:

$$w \propto MTF$$

according to some embodiments. The area A of each tile 602 is directly proportional to the corresponding MTF value:

$$A \propto MTF$$

according to some embodiments.

It should be understood that tile generator 122 can identify any number of various regions that are capable of being viewed perpendicularly (e.g., define different regions based on MTF values), according to some embodiments. The ability to view a region more perpendicularly is positively related to image quality, detail, resolution, etc., that can be viewed in this region, according to some embodiments. Tile generator 122 can identify regions based on how perpendicularly the region can be viewed by the user, and adjust the size of tiles 602 such that regions which are capable of being viewed more perpendicularly are associated with higher quality imagery or smaller tiles 602, according to some embodiments. In this way, tile generator 122 may adjust the size of tiles 602 and/or the quality of images displayed on the tiles 602 to account for image displaying capabilities of lens 2102, according to some embodiments. Advantageously, this reduces processing power by displaying lower quality images in regions which can only be viewed from a tangential angle and are unable to provide high quality images due to the viewing angle, according to some embodiments.

Dynamic Tiling Process

Figure 16:
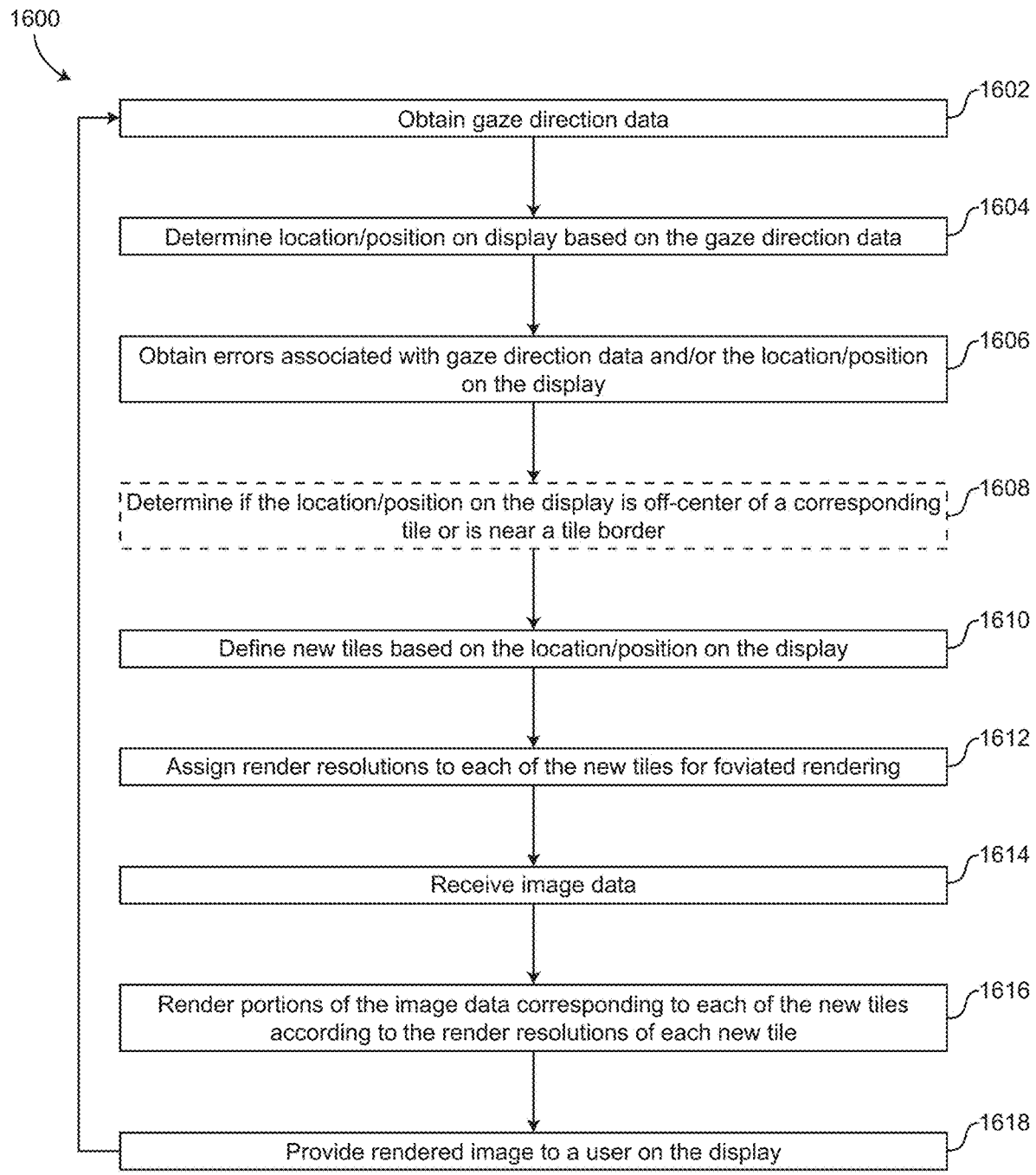
FIG. 16 is a flow diagram of a process for dynamically tiling a display screen and providing foveated rendering based on gaze direction, according to some embodiments.

Referring particularly to FIG. 16, a process 1600 for dynamically tiling and defining tiles is shown, according to some embodiments. Process 1600 includes steps 1602-1618 and is performed by system 100, system 200, etc., to provide foveated rendering with dynamically updated tiling, according to some embodiments. In some embodiments, process 1600 facilitates reducing the processing power of processing circuitry that performs process 1600. Advantageously, process 1600 can be performed by mobile display systems (e.g., head mounted displays, head wearable displays, etc.) that do not have adequate processing power to render an entire image in high resolution. In some embodiments, steps 1602-1612 are performed concurrently with steps 1614-1618.

Process 1600 includes obtaining gaze direction data (step 1602), according to some embodiments. In some embodiments, the gaze direction data includes a position of a user's eyes, a position of the user's pupils, an orientation of the user's eyes, etc. In some embodiments, the gaze direction data indicates a direction of the user's gaze. In some embodiments, step 1602 is performed by one or more of sensors 104. In some embodiments, the gaze direction data includes head direction data. In some embodiments, the gaze direction data includes both eye direction/position data and head direction/position data. In some embodiments, the gaze direction or eye tracking data is provided to eye tracker 118. In some embodiments, the gaze direction data is gaze vector 136, gaze vector 302, gaze location 402, and/or eye tracking data 148. In some embodiments, step 1602 includes obtaining eye tracking data (e.g., eye tracking data 148 and/or head tracking data) and determining a gaze vector (e.g., gaze vector 302) based on the eye tracking data as the gaze direction data. In some embodiments, the gaze direction data includes angles $\theta_1$ and angle $\theta_2$. In some embodiments, step 1602 is at least partially performed by sensors 104 and/or eye tracker 118.

Process 1600 includes determining a location/position on a display based on the gaze direction data (step 1604), according to some embodiments. In some embodiments, step 1604 includes determining a local position/location of a point of interest, a focal point, a gaze point, etc., that the user is looking at or directing their gaze towards on the display (e.g., display 164). In some embodiments, the local position includes an x position and a y position (e.g., Cartesian coordinates) on display 164 relative to an origin, a center of display 164, a reference point, a corner of display 164, etc. In some embodiments, the location/position on the display is a point that is of interest to the user. In some embodiments, step 1604 is performed by tile generator 122 and/or eye tracker 118. In some embodiments, the location/position determined in step 1604 is the position/location of gaze location 402.

Process 1600 includes obtaining errors associated with the gaze direction data and/or the location/position on the display (step 1606), according to some embodiments. In some embodiments, the errors obtained in step 1606 are errors associated with gaze vector 302, gaze vector 136, eye tracking data 148, head tracking data 150, the location/position of gaze location 402, angles $\theta_1$ and $\theta_2$ of gaze vector 302, etc. In some embodiments, step 1606 is performed by error manager 120 based on any of eye tracking data 148, gaze vector 136, head tracking data 150, etc.

Process 1600 includes determining if the location/position on the display is off-center of a corresponding tile or is near a tile border (step 1608), according to some embodiments. In some embodiments, step 1608 includes comparing the location/position on the display (e.g., the location/position of gaze location 402) to a corresponding location/position of tile 602 that the location/position is within. In some embodiments, the location/position on the display deviating from the location/position of the center of the corresponding tile indicates that the user is directing their gaze towards a different location on display 164. In some embodiments, step 1608 includes determining if the location/position on the display (e.g., the location/position of gaze location 402) is near a border of an adjacent tile. In some embodiments, step 1608 includes checking within an area of the display defined by the error to determine if an adjacent border or intersection is within the area. In some embodiments, step 1608 is optional. In some embodiments, step 1608 is performed by tile generator 122.

Process 1600 includes defining new tiles based on the location/position on the display (step 1610), according to some embodiments. In some embodiments, step 1610 is performed by tile generator 122. In some embodiments, a first new tile is defined that is centered about the location/position on the display that the user is directing their gaze towards. In some embodiments, additional tiles are generated that surround the first new tile and fill-out the rest of the display. In some embodiments, a size of the tiles (e.g., a height and a width) is predetermined. In some embodiments, the ratio between the height and the width of the new tiles is a predetermined or fixed ratio. In some embodiments, the size, shape, area, etc., of the new tiles are determined or defined based on the error determined in step 1606. In some embodiments, the size, shape, area, etc., of the new tiles are predetermined.

Process 1600 includes assigning various render resolutions to each of the tiles for foveated rendering (step 1612), according to some embodiments. In some embodiments, step 1612 is performed by tile generator 122. In some embodiments, various render qualities are used. For example, some tiles can be assigned a high resolution render quality, other tiles may be assigned a medium resolution render quality, other tiles a low resolution render quality, etc. In some embodiments, any number of different render qualities are used. For example, the render qualities can include a high resolution and a low resolution quality, according to some embodiments. In some embodiments, the render resolutions are assigned to each tile (e.g., tiles 602) to achieve foveated rendering. For example, tiles at or near the location/position that the user is directing their gaze or focusing upon can be assigned high resolution render quality, according to some embodiments. In some embodiments, tiles that are farther away from the location/position on the display that the user is focusing upon have lower render quality. In some embodiments, tiles directly adjacent the first new tile have a medium or high resolution quality. In some embodiments, tiles other than the high and medium resolution quality tiles are assigned the low resolution render quality.

Process 1600 includes receiving image data (step 1614), according to some embodiments. In some embodiments, the image data is image data 132. In some embodiments, the image data includes three dimensional objects, characters, particles, pre-rendered images, textures, materials, lights, etc. In some embodiments, step 1614 is performed by image renderer 124.

Process 1600 includes rendering portions of the image data corresponding to each of the new tiles (e.g., the tiles defined in step 1610) according to the render resolutions (e.g., as assigned or defined in step 1612) of each new tile (step 1616), according to some embodiments. In some embodiments, step 1616 is performed by a render engine. In some embodiments, step 1616 is performed by image renderer 124. In some embodiments, rendering an image includes rendering or rasterizing the image at a render quality and upscaling the rendered image to fit a corresponding tile. For example, portions of the image data that will be displayed on low-render quality tiles may be rendered or rasterized at low quality, then up-scaled to fit the size of the tiles, according to some embodiments. Likewise, portions of the image that will be displayed in medium-quality tiles can be rendered or rasterized at medium quality, then up-scaled to fit the size of the tiles, according to some embodiments.

Process 1600 includes providing the rendered image (e.g., the image rendered in step 1616) to a user on the display (step 1618), according to some embodiments. In some embodiments, the various portions of the image that are rendered or rasterized in step 1616 are assembled and displayed on corresponding tiles of the display and provided to the user. In some embodiments, step 1618 is performed by image renderer 124 and/or display(s) 164.

Process 1600 can return to step 1602 in response to performing step 1618, according to some embodiments. In some embodiments, process 1600 is performed prior to displaying a new frame to the user on the display. In some embodiments, process 1600 facilitates dynamically re-updating and/or re-defining the tiles to provide reduced processing power foveated rendering. Advantageously, process 1600 allows low processing power display systems to track the user's eyes, determine a focal point, and render foveated images to the user based on the focal point of the user's eyes, according to some embodiments.

Figure 17:
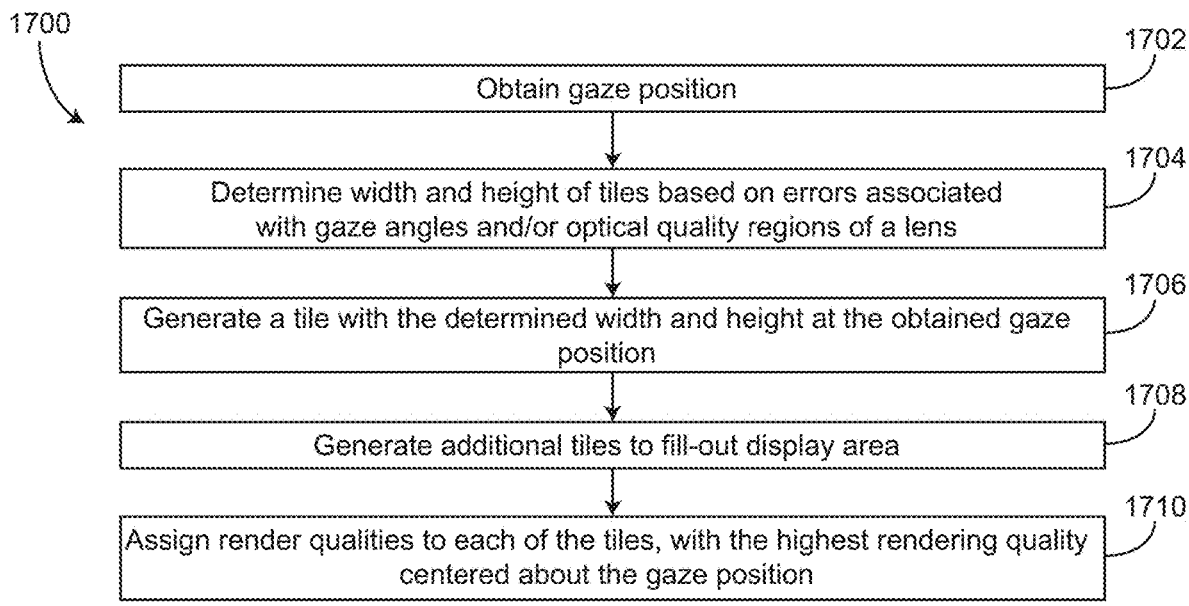
FIG. 17 is a flow diagram of a process for dynamically defining one or more new tiles based on a user's gaze position, according to some embodiments.

Referring now to FIG. 17, a process 1700 for defining or generating tiles for a tiled foveated rendering system is shown, according to some embodiments. In some embodiments, process 1700 is performed by processing circuitry 116. In some embodiments, process 1700 is performed to define new tiles and to assign render resolutions to the new tiles (steps 1610 and 1612).

Process 1700 includes obtaining gaze position (step 1702), according to some embodiments. In some embodiments, the gaze position is the location/position of gaze location 402 on display 164. In some embodiments, the gaze position is or includes angles $\theta_1$ and $\theta_2$ (shown in FIGS. 3-5). In some embodiments, step 1702 is the same as or similar to steps 1602 and 1604 of process 1600. In some embodiments, step 1702 is performed by eye tracker 118 based on eye tracking data 148. In some embodiments, the gaze position (e.g., gaze location 402) is a point on display 164 that gaze vector 136/302 is directed towards.

Process 1700 includes determining width and height of one or more tiles based on errors associated with gaze angles and/or based on optical quality regions of a lens (step 1704), according to some embodiments. In some embodiments, higher errors associated with the gaze angles (e.g., angles $\theta_1$ and/or $\theta_2$) correspond to larger values of the width w and height h of one or more tiles. In some embodiments, the error associated with angle $\theta_1$ is associated with the height h of the one or more tiles. In some embodiments, the error associated with angle $\theta_2$ is associated with the width w of the one or more tiles. In some embodiments, step 1704 is performed by tile generator 122. In some embodiments, the errors associated with the gaze angles are determined by error manager 120 based on eye tracking data 148. In some embodiments, other errors are used to determine the width w and the height h of the one or more tiles. For example, errors in the x and y position of the gaze position on display 164 can be used to determine the height h and the width w of the one or more tiles, according to some embodiments. In some embodiments, the gaze position is the location/position of gaze location 402. In some embodiments, the errors are any of errors associated with angles $\theta_1$ and $\theta_2$, the x and y positions of gaze location 402, etc.

In some embodiments, step 1704 includes determining a range of locations, angles, etc., where the gaze position may be. For example, the error can be used to determine a range of values of angle $\theta_1$ such as: $\theta_{1,range} = \theta_1 \pm \Delta\theta_1$ and: $\theta_{2,range} = \theta_2 \pm \Delta\theta_2$, where $\theta_{1,range}$ is a range of values of the angle $\theta_1$, $\Delta\theta_1$ is the error associated with $\theta_1$, $\theta_{2,range}$ is a range of values of the angle $\theta_2$, and $\Delta\theta_2$ is the error associated with $\theta_2$. In some embodiments, the range of values for angles $\theta_1$ and $\theta_2$ translates to a range of locations/positions on display 164. For example, $\theta_{1,range}$ can translate to a range of y positions $\Delta y$ on display 164, and $\theta_{2,range}$ can translate to a range of x positions $\Delta x$ on display 164, according to some embodiments. In some embodiments, the ranges of x locations/positions and y locations/positions is represented in FIGS. 6-15 as error 604. Likewise, the errors associated with angles $\theta_1$ and $\theta_2$ can translates to errors associated with the x position and the y position of the gaze position on display 164.

Step 1704 can include using any of the errors associated with the gaze direction (e.g., associated with gaze vector 302), the gaze position (e.g., errors associated with the position/location of gaze location 402) to determine or choose the height h and the width w of the one or more tiles, according to some embodiments. In some embodiments, the errors are used to independently select, determine, choose, etc., the height h and width w of the one or more tiles (e.g., the error associated with the x position of gaze location 402 is used to determine the width w of the one or more tiles, and the error associated with the y position of gaze location 402 is used to determine the height h of the one or more tiles). In some embodiments, the height h and the width w of the one or more tiles is a predetermined or predefined ratio.

In some embodiments, regional quality of a lens of the display is used to determine the shape, size, etc., of the one or more tiles. In some embodiments, for example, a lens of display 164 can have lower quality regions (e.g., around a perimeter or at an outer periphery of the lens) and higher quality regions (e.g., at or near a center of the lens). In some embodiments, the height h and width w of the one or more tiles are chosen, selected, determined, etc., based on the quality of a region of the lens at which each of the one or more tiles will be displayed. For example, if a tile will be displayed at a lower quality region of the lens of the display, the tile may have a smaller height h and width w, according to some embodiments. Likewise, if a tile will be displayed at a higher quality region of the lens of the display, the tile may have a larger height h and width w, according to some embodiments. In some embodiments, a combination of both the regional quality of the lens and the errors associated with the gaze angles (or the gaze position) are used to determine the height h and the width w of each of the one or more tiles. In some embodiments, each of the one or more tiles has a uniform height h and width w. In some embodiments, the one or more tiles have a non-uniform height h and width w. For example a tile centered at the gaze position may have a higher value of the height h and width w if the gaze position is at a higher resolution region or area of the lens of the display. Likewise, a tile centered at the gaze position may have a lower value of the height h and width w if the gaze position is at a lower resolution/quality region.

In some embodiments, the values of the height h and the width w of each of the one or more tiles is proportional or directly related to the resolution quality of a corresponding region of the lens of the display where the tiles are positioned (e.g., higher resolution quality areas of the lens of the display correspond to larger tiles). In some embodiments, the values of the height h and the width w of each of the one or more tiles are inversely proportional or inversely related to the resolution quality of the corresponding region of the lens of the display where the tiles are position (e.g., lower resolution quality areas/regions of the lens of the display correspond to smaller tiles).

Process 1700 includes generating a tile with the determined width and height at the obtained gaze position (step 1706), according to some embodiments. In some embodiments, the generated tile is positioned at the obtained gaze position. In some embodiments, the generated tile has the width w and height h as determined in step 1704 based on the errors associated with the gaze angles and/or the optical quality region of the lens of the display. In some embodiments, the tile is defined and generated by tile generator 122. In some embodiments, the tile is a render region with high quality.

Process 1700 includes generating additional tiles to fill-out a display area of the display (step 1708), according to some embodiments. In some embodiments, additional tiles are generated to fill out remaining area of the display that the tile generated in step 1706 does not cover. The additional tiles have a height h and a width w that can be determined in step 1704 and/or can be determined using any of the techniques described in greater detail above with reference to step 1704 (e.g., based on errors associated with gaze angles, based on regional quality of a lens of the display, etc.), according to some embodiments. In some embodiments, the additional tiles have non-uniform height h and width w. In some embodiment, step 1708 is performed by tile generator 122.

Process 1700 includes assigning render qualities to each of the tiles, with the highest rendering quality centered about the gaze position (step 1710), according to some embodiments. In some embodiments, centering the highest resolution/rendering quality at the gaze position facilitates foveated rendering of imagery on the display. In some embodiments, step 1710 is performed by tile generator 122. In some embodiments, various predetermined quality levels are assigned to each of the tiles. For example, tile generator 122 can assign any of a high quality, a medium quality, a lower quality, etc., to each of the tiles, according to some embodiments. In some embodiments, tile generator 122 uses more or less than three predetermined quality levels for each of the tiles. In some embodiments, the render quality of each of the tiles is determined based on a distance of each tile from the tile that is centered about the gaze position. In some embodiments, the render quality assigned to tiles decreases with increased distance from the tile that is centered at the gaze position. In this way, tiles that are viewed in the user's peripheral vision may have reduced resolution/quality, thereby facilitating improved processing capabilities, according to some embodiments.

In some embodiments, process 1700 proceeds to step 1614 of process 1600 in response to completing step 1710. In some embodiments, process 1700 redefines the tiles for subsequent iterations of process 1700. In some embodiments, if the gaze position is still sufficiently at or near the center of a previously generated high resolution quality tile, the previously generated tiles are maintained. For example, if a user maintains their gaze near or at the center of a high resolution quality tile that is previously generated, the previously generated tiles can be maintained, according to some embodiments. In some embodiments, if the gaze position (e.g., the position/location of gaze location 402 on display 164) changes significantly (e.g., shifts towards another tile, shifts to a lower resolution quality tile, etc.), process 1700 determines that tiles should be re-generated/redefined to account for the change in the gaze position. In some embodiments, process 1700 includes a step or process of temporarily decreasing the size of the tiles (e.g., the height h and/or width w) prior to displaying imagery with the newly defined tiles. In some embodiments, process 1700 includes temporarily increasing the resolution quality of tiles during a transition to new tile definition/layout. In this way, transitions between new tile definitions, layouts, sizes, positions, etc., may be smoothed to facilitate reducing the likelihood that the user will notice the transition, according to some embodiments.

Figure 18:
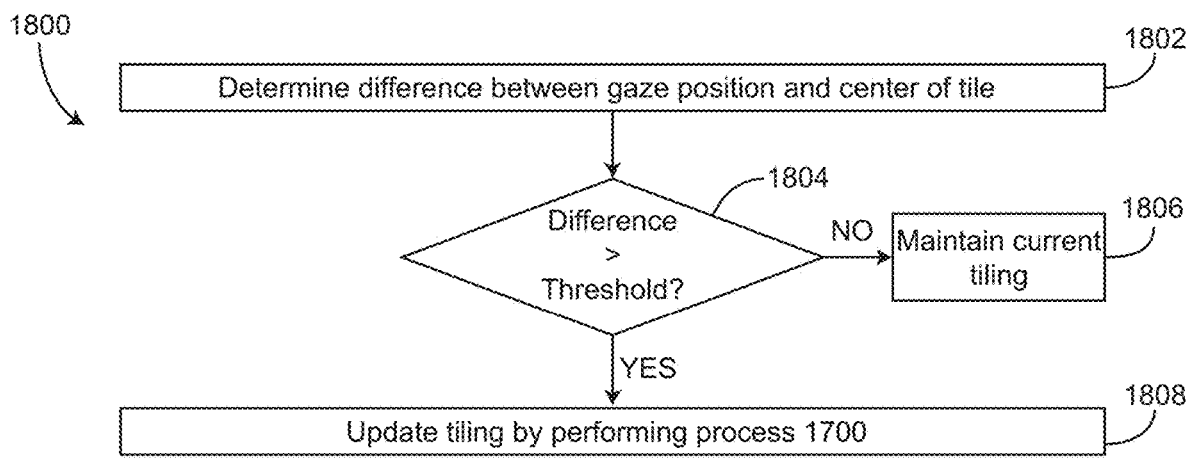
FIG. 18 is a flow diagram of a process for determining if new tiles should be defined based on a user's gaze, according to some embodiments.

Referring now to FIG. 18, a process 1800 for determining if the tiles should be redefined or re-generated is shown, according to some embodiments. Process 1800 includes steps 1802-1808, according to some embodiments. In some embodiments, process 1800 is performed by tile generator 122. In some embodiments, process 1800 is performed prior to performing process 1700. Process 1800 is performed by tile generator 122 to determine if the tiles (e.g., tiles 602) of the display (e.g., display 164) should be redefined, resized, rearranged, etc., according to some embodiments.

Process 1800 includes determining a difference between the gaze position and a center of a corresponding tile (step 1802), according to some embodiments. In some embodiments, step 1802 includes determining a difference in an x direction and a y direction between the center of the corresponding tile and the gaze position. In some embodiments, step 1802 includes determining a difference between an angular value of angle $\theta_1$ that corresponds to the center of the corresponding tile and an angular value of angle $\theta_1$ that corresponds to the gaze position. In some embodiments, step 1802 includes determining a difference between an angular value of angle $\theta_2$ that corresponds to the center of the corresponding tile and an angular value of angle $\theta_2$ that corresponds to the gaze position. The corresponding tile is the tile that gaze position is currently or was previously centered at (or centered near), according to some embodiments.

Process 1800 includes determining if the difference as determined in step 1802 is greater than (or greater than or equal to) a threshold value (step 1804), according to some embodiments. In some embodiments, step 1804 includes comparing any of the deviation of the x and/or y values of the gaze position on the display from the centerpoint of the corresponding tile to one or more threshold values. In some embodiments, step 1804 includes comparing a magnitude of deviation between the gaze position on the display and the centerpoint of the corresponding tile to a threshold value. The threshold value is proportional to at least one of the height h and the width w of the corresponding tile, according to some embodiments. For example, the threshold value can be 10% of the width w of the corresponding tile, 25% of the height h of the corresponding tile, etc., according to some embodiments. In some embodiments, step 1804 is performed by tile generator 122.

Process 1800 includes maintaining a current tiling arrangement or definition (step 1806) in response to the difference being less than the threshold value(s) (step 1804, "NO"), according to some embodiments. In some embodiments, if the gaze position does not deviate from the center point of the corresponding tile by a predetermined amount (e.g., the threshold value in step 1804), process 1800 proceeds to step 1806 and maintains current tiling. In some embodiments, step 1806 is performed by tile generator 122.

Process 1800 includes updating the tiling by performing process 1700 in response to the difference being greater than (or greater than or equal to) the threshold value (step 1808), according to some embodiments. In some embodiments, if the difference is greater than (or greater than or equal to) the threshold value (step 1804, "YES"), process 1800 proceeds to step 1808. In some embodiments, step 1808 is performed by tile generator 122. In some embodiments, step 1808 includes performing process 1700 and various steps of process 1600. In some embodiments, process 1800 includes an additional step of displaying one or more frames with reduced tile size prior to performing process 1700, or prior to performing step 1618 of process 1600 to facilitate a smooth transition between current or previous tiling arrangement/definitions and subsequent/updated tiling arrangements/definitions.

Figure 19:
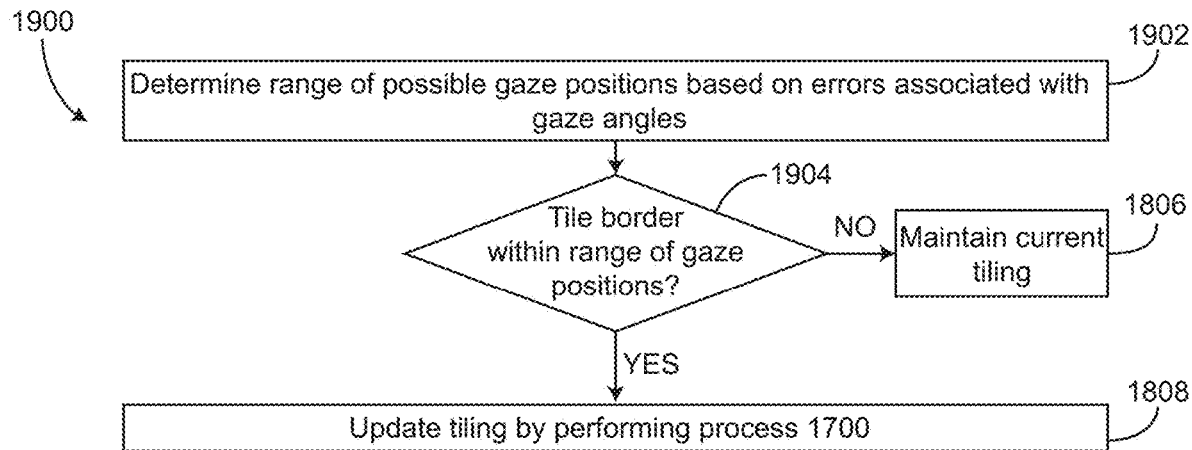
FIG. 19 is a flow diagram of a process for determining if new tiles should be defined based on gaze error, according to some embodiments.

Referring now to FIG. 19, a process 1900 for determining if the tiles should be redefined or re-generated is shown, according to some embodiments. Process 1900 includes steps 1902-1904, and steps 1806 and 1808, according to some embodiments. In some embodiments, process 1900 is similar to process 1800. In some embodiments, process 1900 is combined with process 1800. In some embodiments, process 1900 is performed by tile generator 122.

Process 1900 includes determining a range of possible gaze positions based on errors associated with gaze angles (step 1902), according to some embodiments. In some embodiments, step 1902 includes determining a range of locations, positions, etc., on display 164 that the user's gaze may be directed (e.g., error 604) based on errors associated with the user's gaze angles (e.g., based on gaze error 126, errors associated with angles $\theta_1$ and $\theta_2$, etc.). In some embodiments, the range of possible gaze positions is a region or area of display 164. In some embodiments, the range of possible gaze positions is centered about the gaze position (e.g., centered about gaze location 402). In some embodiments, step 1902 is performed by error manager 120 and/or tile generator 122.

Process 1900 includes determining if a tile border is within the range of possible gaze positions (step 1904), according to some embodiments. In some embodiments, the tile border is any of a border between adjacent tiles, an intersection between one or more tiles, an intersection between a corner of one or more tiles, etc. In response to a tile border being within the range of possible gaze positions (step 1904, "YES"), process 1900 proceeds to step 1808, according to some embodiments. In response to a tile border not being within the range of possible gaze positions (step 1904, "NO"), process 1900 proceeds to step 1806. In some embodiments, step 1904 is performed by tile generator 122.

In some embodiments, process 1900 and 1800 are combined. For example, step 1904 and all subsequent steps of process 1900 can be performed in response to step 1804 of process 1800 (e.g., in response to "NO" of step 1804, or in response to "YES" of step 1804), according to some embodiments. In some embodiments, step 1804 and all subsequent steps of process 1800 are performed in response to step 1904 of process 1900 (e.g., in response to "YES" of step 1904, or in response to "NO" of step 1904).

Server System

Figure 20:
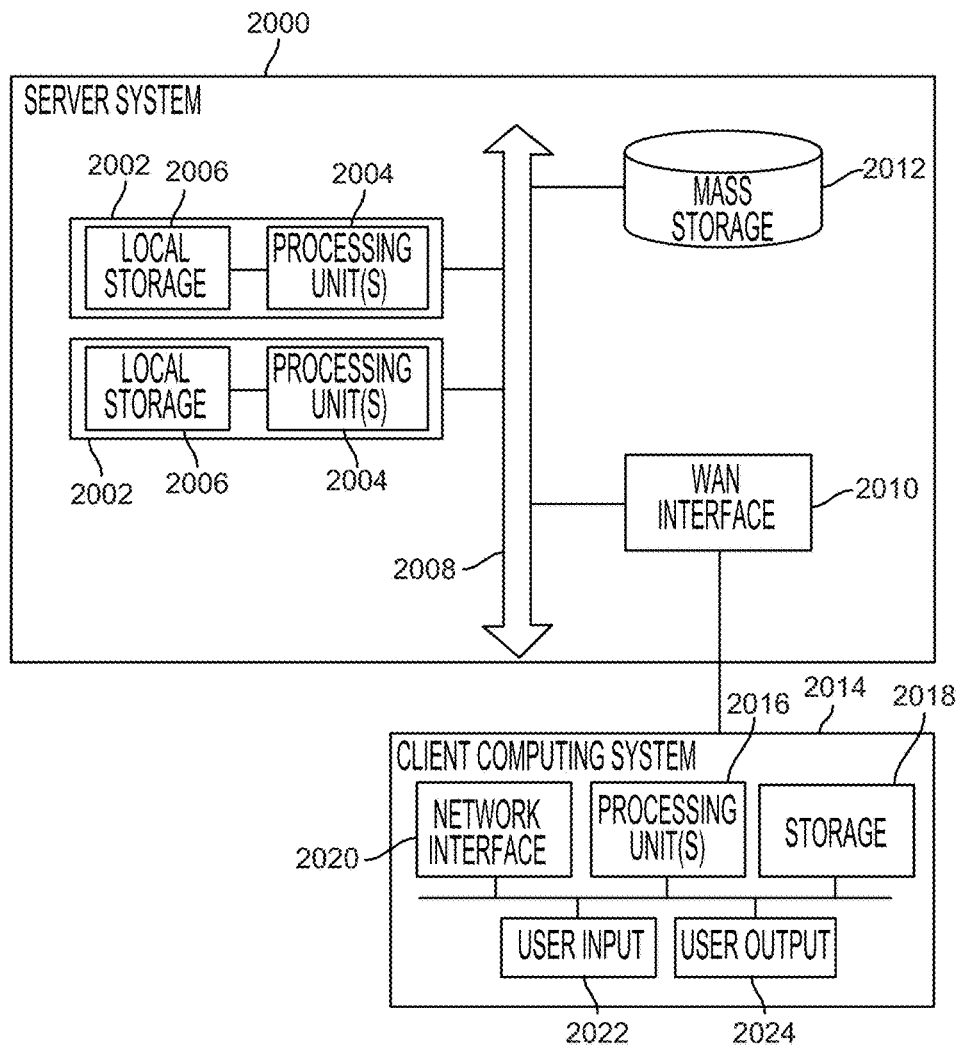
FIG. 20 is a block diagram of a computing environment that the systems of FIGS. 1 and 2 can be implemented in, according to some embodiments.

Various operations described herein can be implemented on computer systems. FIG. 20 shows a block diagram of a representative server system 2000 and client computer system 2014 usable to implement the present disclosure. Server system 2000 or similar systems can implement services or servers described herein or portions thereof. Client computer system 2014 or similar systems can implement clients described herein. Each of systems 100, 200 and others described herein can incorporate features of systems 2000, 2014.

Server system 2000 can have a modular design that incorporates a number of modules 2002 (e.g., blades in a blade server); while two modules 2002 are shown, any number can be provided. Each module 2002 can include processing unit(s) 2004 and local storage 2006.

Processing unit(s) 2004 can include a single processor, which can have one or more cores, or multiple processors. Processing unit(s) 2004 can include a general-purpose primary processor as well as one or more special-purpose co-processors such as graphics processors, digital signal processors, or the like. Some or all processing units 2004 can be implemented using customized circuits, such as application specific integrated circuits (ASICs) or field programmable gate arrays (FPGAs). Such integrated circuits execute instructions that are stored on the circuit itself. Processing unit(s) 2004 can execute instructions stored in local storage 2006. Any type of processors in any combination can be included in processing unit(s) 2004.

Local storage 2006 can include volatile storage media (e.g., conventional DRAM, SRAM, SDRAM, or the like) and/or non-volatile storage media (e.g., magnetic or optical disk, flash memory, or the like). Storage media incorporated in local storage 2006 can be fixed, removable or upgradeable as desired. Local storage 2006 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2004 need at runtime. The ROM can store static data and instructions that are needed by processing unit(s) 2004. The permanent storage device can be a non-volatile read-and-write memory device that can store instructions and data even when module 2002 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 2006 can store one or more software programs to be executed by processing unit(s) 2004, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 2004 cause server system 2000 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 2004. Software can be implemented as a single program or a collection of separate programs or program modules that interact as desired. From local storage 2006 (or non-local storage described below), processing unit(s) 2004 can retrieve program instructions to execute and data to process in order to execute various operations described above.

In some server systems 2000, multiple modules 2002 can be interconnected via a bus or other interconnect 2008, forming a local area network that supports communication between modules 2002 and other components of server system 2000. Interconnect 2008 can be implemented using various technologies including server racks, hubs, routers, etc.

A wide area network (WAN) interface 2010 can provide data communication capability between the local area network (interconnect 2008) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 2006 can provide working memory for processing unit(s) 2004, providing fast access to programs and/or data to be processed while reducing traffic on interconnect 2008. Storage for larger quantities of data can be provided on the local area network by one or more mass storage subsystems 2012 that can be connected to interconnect 2008. Mass storage subsystem 2012 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2012. Additional data storage resources may be accessible via WAN interface 2010 (potentially with increased latency).

Server system 2000 can operate in response to requests received via WAN interface 2010. For example, one of modules 2002 can implement a supervisory function and assign discrete tasks to other modules 2002 in response to received requests. Conventional work allocation techniques can be used. As requests are processed, results can be returned to the requester via WAN interface 2010. Such operation can generally be automated. WAN interface 2010 can connect multiple server systems 2000 to each other, providing scalable systems capable of managing high volumes of activity. Conventional or other techniques for managing server systems and server farms (collections of server systems that cooperate) can be used, including dynamic resource allocation and reallocation.

Server system 2000 can interact with various user-owned or user-operated devices via a wide-area network such as the Internet. An example of a user-operated device is shown in FIG. 20 as client computing system 2014. Client computing system 2014 can be implemented, for example, as a consumer device such as a smartphone, other mobile phone, tablet computer, wearable computing device (e.g., smart watch, eyeglasses), desktop computer, laptop computer, and so on.

For example, client computing system 2014 can communicate via WAN interface 2010. Client computing system 2014 can include conventional computer components such as processing unit(s) 2016, storage device 2018, network interface 2020, user input device 2022, and user output device 2024. Client computing system 2014 can be a computing device implemented in a variety of form factors, such as a desktop computer, laptop computer, tablet computer, smartphone, other mobile computing device, wearable computing device, or the like.

Processor 2016 and storage device 2018 can be similar to processing unit(s) 2004 and local storage 2006 described above. Suitable devices can be selected based on the demands to be placed on client computing system 2014; for example, client computing system 2014 can be implemented as a "thin" client with limited processing capability or as a high-powered computing device. Client computing system 2014 can be provisioned with program code executable by processing unit(s) 2016 to enable various interactions with server system 2000 of a message management service such as accessing messages, performing actions on messages, and other interactions described above. Some client computing systems 2014 can also interact with a messaging service independently of the message management service.

Network interface 2020 can provide a connection to a wide area network (e.g., the Internet) to which WAN interface 2010 of server system 2000 is also connected. Network interface 2020 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2022 can include any device (or devices) via which a user can provide signals to client computing system 2014; client computing system 2014 can interpret the signals as indicative of particular user requests or information. User input device 2022 can include any or all of a keyboard, touch pad, touch screen, mouse or other pointing device, scroll wheel, click wheel, dial, button, switch, keypad, microphone, and so on.

User output device 2024 can include any device via which client computing system 2014 can provide information to a user. For example, user output device 2024 can include a display to display images generated by or delivered to client computing system 2014. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 2024 can be provided in addition to or instead of a display. Examples include indicator lights, speakers, tactile "display" devices, printers, and so on.

Configuration of Exemplary Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and B" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method of providing imagery to a user on a display, the method comprising:
   receiving eye tracking data;
   determining a gaze location on the display or a gaze vector using the eye tracking data;

defining a first tile using the gaze location on the display or the gaze vector, wherein the first tile has a height and a width, the height and width being determined using the eye tracking data;

defining a plurality of additional tiles to fill an entire area of the display; and providing a portion of an image using the first tile at a first image quality and providing another portion of the image at a second image quality using at least one of the plurality of additional tiles.

2. The method of claim 1, wherein the eye tracking data indicates a direction of gaze of the user.

3. The method of claim 2, wherein obtaining eye tracking data comprises monitoring an angular orientation of the user's eye about a first axis and a second axis to determine the direction of gaze of the user.

4. The method of claim 1, wherein the height or the width of the first tile is defined based on any of, or a combination of:
- a vertical or horizontal error of the gaze location;
- a rate of change of the vertical or horizontal error of the gaze location;
- a vertical or horizontal position of the gaze location;
- an MTF value of a lens of the display at the gaze location; and
- a rate of change of the vertical or horizontal position of the gaze location.

5. The method of claim 1, further comprising:
re-defining the first tile and the plurality of additional tiles in response to a change of the gaze location to a new gaze location on the display;
wherein the first tile is redefined to be centered at the new gaze location.

6. The method of claim 5, wherein the first tile and the plurality of additional tiles are redefined in response to the gaze location on the display changing at least a threshold amount.

7. The method of claim 5, wherein the first tile and the plurality of additional tiles are redefined in response to the direction of gaze changing at least a threshold angular amount in a vertical direction or a horizontal direction.

8. The method of claim 1, further comprising:
determining an error associated with the direction of gaze of the user;
defining at least one of the height and the width of the first tile based on the error associated with the direction of gaze of the user.

9. The method of claim 1, further comprising:
defining one or more regions related to image displaying capabilities of different areas of the display; and
defining a size of the first and each of the plurality of additional tiles based on which of the one or more regions the tiles are displayed.

10. The method of claim 9, wherein the one or more regions are defined based on a magnitude of a tangential viewing angle for the different areas of the display.

11. A head mounted display for providing imagery to a user, the head mounted display comprising:
a display;
an eye tracker configured to provide eye tracking data; and
a processor configured to:
determine a gaze location on the display or a gaze vector using the eye tracking data;
define a first tile using the gaze location or the gaze vector; and
define a plurality of additional tiles to fill an area of the display;
wherein a portion of an image is provided on the display using the first tile at a first image quality and other portions of the image are provided on the display at a second image quality using at least one of the plurality of additional tiles.

12. The head mounted display of claim 11, wherein the processor is configured to monitor an angular orientation of the user's eye about a first axis and a second axis to determine a direction of gaze of the user.

13. The head mounted display of claim 11, wherein the second image quality is lower than the first image quality.

14. The head mounted display of claim 11, wherein the processor is configured to define a height or a width of the first tile based on any of, or a combination of:
- a vertical error of the gaze location;
- a rate of change of the vertical error of the gaze location;
- a vertical position of the gaze location;
- a modulation transfer function value of a lens of the display at the gaze location; and
- a rate of change of the vertical position of the gaze location.

15. The head mounted display of claim 11, wherein the processing circuitry is further configured to:
redefine the first tile and the plurality of additional tiles in response to a change of the gaze location to a new gaze location on the display;
wherein the first tile is redefined to be centered at the new gaze location.

16. The head mounted display of claim 11, wherein the processor is configured to determine an error associated with the direction of gaze of the user and define at least one of a height and a width of the first tile based on the error associated with the direction of gaze of the user.

17. The head mounted display of claim 11, wherein the processor is configured to:
identify one or more regions based on image displaying capabilities of different areas of the display; and
define a size of the first and each of the plurality of additional tiles based on which of the one or more regions the tiles are displayed.

18. The head mounted display of claim 17, wherein the processor is configured to identify the one or more regions based on a magnitude of a tangential viewing angle for the different areas of the display.

19. A display for providing foveated imagery to a user, the display comprising processing circuitry configured to:
track a gaze direction or a gaze vector of the user's eye;
define a first tile based on the gaze direction or gaze vector of the user's eye, wherein a location of the first tile is defined using the gaze direction or the gaze vector and is for a first image quality;
define one or more additional tiles for a second image quality different than the first image quality;
provide imagery using the first tile and each of the one or more additional tiles; and
redefine the location of the first tile in response to a change in the gaze direction or gaze vector.

20. The display of claim 19, wherein the processing circuitry is configured to repeat the steps of defining the first tile, defining the one or more additional tiles, and providing the imagery in response to at least one of:
the gaze direction of the user's eye changing at least a threshold amount; and the gaze direction of the user's eye being within a threshold distance from a border between the first tile and an adjacent tile.

\* \* \* \* \*